US011903051B2

United States Patent
Masini et al.

(10) Patent No.: US 11,903,051 B2
(45) Date of Patent: Feb. 13, 2024

(54) NETWORK NODES AND METHODS THEREIN FOR ENABLING A SWITCH BETWEEN FEEDER LINKS FOR AN AIRBOURNE OR ORBITAL COMMUNICATION NODE IN A NON-TERRESTRIAL COMMUNICATIONS NETWORK

(71) Applicant: Telefonaktiebolaget LM Ericsson (publ), Stockholm (SE)

(72) Inventors: Gino Masini, Stockholm (SE); Helka-Liina Määttänen, Helsinki (FI); Martin Israelsson, Spånga (SE); Björn Hofström, Linköping (SE); Jonas Sedin, Sollentuna (SE); Sebastian Euler, Storvreta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 247 days.

(21) Appl. No.: 17/430,782

(22) PCT Filed: Feb. 11, 2020

(86) PCT No.: PCT/SE2020/050135
§ 371 (c)(1),
(2) Date: Aug. 13, 2021

(87) PCT Pub. No.: WO2020/167220
PCT Pub. Date: Aug. 20, 2020

(65) Prior Publication Data
US 2022/0141891 A1    May 5, 2022

Related U.S. Application Data

(60) Provisional application No. 62/805,373, filed on Feb. 14, 2019.

(51) Int. Cl.
*H04W 76/12* (2018.01)
*H04B 7/185* (2006.01)
*H04W 84/06* (2009.01)

(52) U.S. Cl.
CPC ........ *H04W 76/12* (2018.02); *H04B 7/18528* (2013.01); *H04W 84/06* (2013.01)

(58) Field of Classification Search
None
See application file for complete search history.

(56) References Cited

U.S. PATENT DOCUMENTS 10,506,483 B1    12/2019    Williamson et al.
2006/0189275 A1    8/2006    Karabinis
(Continued)

FOREIGN PATENT DOCUMENTS

| CN | 106067840 A | * 11/2016 | ......... H04B 7/18519 |
|---|---|---|---|
| CN | 110572203 A | 12/2019 | |

(Continued)

OTHER PUBLICATIONS

3GPP, "3rd Generation Partnership Project; Technical Specification Group Radio Access Network; NG-RAN; F1 application protocol (F1AP) (Release 15)", 3GPP TS 38.473 V15.4.1, Jan. 2019, 1-192.

(Continued)

*Primary Examiner* — Khalid W Shaheed
(74) *Attorney, Agent, or Firm* — Murphy, Bilak & Homiller, PLLC

(57) ABSTRACT

A method performed by a first network node (101) for enabling a second feeder link (132) to be established between a second network node (102) and an airborne or orbital communication node (110) in non-terrestrial communications network (100) to handle wireless devices (121) being served by the airborne or orbital communication node (110) is provided. The first network node (101) is handling (Continued)

the wireless devices (121) served by the airborne or orbital communication node (110) over a first feeder link (131) between the first network node (101) and the airborne or orbital communication node (110). The method comprises determining (701) that the wireless devices served by the airborne or orbital communication node (110) are to be handled by the second network node (102) over the second feeder link (132). Also, the method comprises initiating (702) the second feeder link (132) to be established between the second network node (102) and the airborne or orbital communication node (110). Further, a first network node (101) for enabling a second feeder link (132) to be established between a second network node (102) and an airborne or orbital communication node (110) in non-terrestrial communications network (100) to handle wireless devices (121) being served by the airborne or orbital communication node (110) is also provided. A second network node and a method therein, as well as, computer programs and carriers are further provided.

13 Claims, 20 Drawing Sheets

(56) References Cited

U.S. PATENT DOCUMENTS

| | | | |
|---|---|---|---|
| 2013/0088983 A1* | 4/2013 | Pragada | H04W 24/10 370/252 |
| 2015/0271730 A1* | 9/2015 | Benammar | H04B 7/195 455/436 |

FOREIGN PATENT DOCUMENTS

| | | |
|---|---|---|
| GB | 2317787 A | 4/1998 |
| WO | 03021977 A2 | 3/2003 |
| WO | 2013010370 A1 | 1/2013 |
| WO | 2018052744 A2 | 3/2018 |
| WO | 2019159164 A1 | 8/2019 |
| WO | 2020034318 A1 | 2/2020 |
| WO | 2020051508 A1 | 3/2020 |
| WO | 2020067962 A1 | 4/2020 |

OTHER PUBLICATIONS

3GPP, "3rd Generation Partnership Project; Technical Specification Group Radio Access Network; NG-RAN; Architecture description (Release 15)", 3GPP TS 38.401 V15.4.0, Dec. 2018, 1-40.

3GPP, "3rd Generation Partnership Project; Technical Specification Group Radio Access Network; NG-RAN; NG Application Protocol (NGAP) (Release 15)", 3GPP TS 38.413 V15.2.0, Dec. 2018, 1-308.

3GPP, "3rd Generation Partnership Project; Technical Specification Group Radio Access Network; NG-RAN; Xn application protocol (XnAP) (Release 15)", 3GPP TS 38.423 V15.2.0, Dec. 2018, 1-281.

3GPP, "3rd Generation Partnership Project; Technical Specification Group Radio Access Network; NR; NR and NG-RAN Overall Description; Stage 2 (Release 15)", 3GPP TS 38.300 V15.4.0, Dec. 2018, 1-97.

3GPP, "3rd Generation Partnership Project; Technical Specification Group Radio Access Network; Solutions for NR to support non-terrestrial networks (NTN) (Release 16)", 3GPP TR 38.821 V0.3.0, R3-187281, Nov. 2018, 1-33.

3GPP, "3rd Generation Partnership Project; Technical Specification Group Radio Access Network; Study on New Radio (NR) to support non terrestrial networks (Release 15)", 3GPP TR 38.811 V15.0.0, Jun. 2018, 1-118.

3GPP, "3rd Generation Partnership Project; Technical Specification Group Radio Access Network; Study on new radio access technology: Radio access architecture and interfaces (Release 14)", 3GPP TR 38.801 V14.0.0, Mar. 2017, 1-91.

Stewart, R., "Stream Control Transmission Protocol", Network Working Group, Request for Comments: 4960, Sep. 2007, 1-152.

Unknown, Author, "Study on solutions evaluation for NR to support Non Terrestrial Network", 3GPP TSG RAN meeting #80, RP-181370, La Jolla, USA, Jun. 11-14, 2018, 1-5.

* cited by examiner

701. Determining that the wireless devices served by the airborne or orbital communication node are to be handled by the second network node over the second feeder link

702. Initiating the second feeder link to be established between the second network node and the airborne or orbital communication node

Fig. 7

801. Determining that the wireless devices served by the airborne or orbital communication node are to be handled by the second network node over the second feeder link

802. Establishing the second feeder link towards the airborne or orbital communication node

Fig. 8

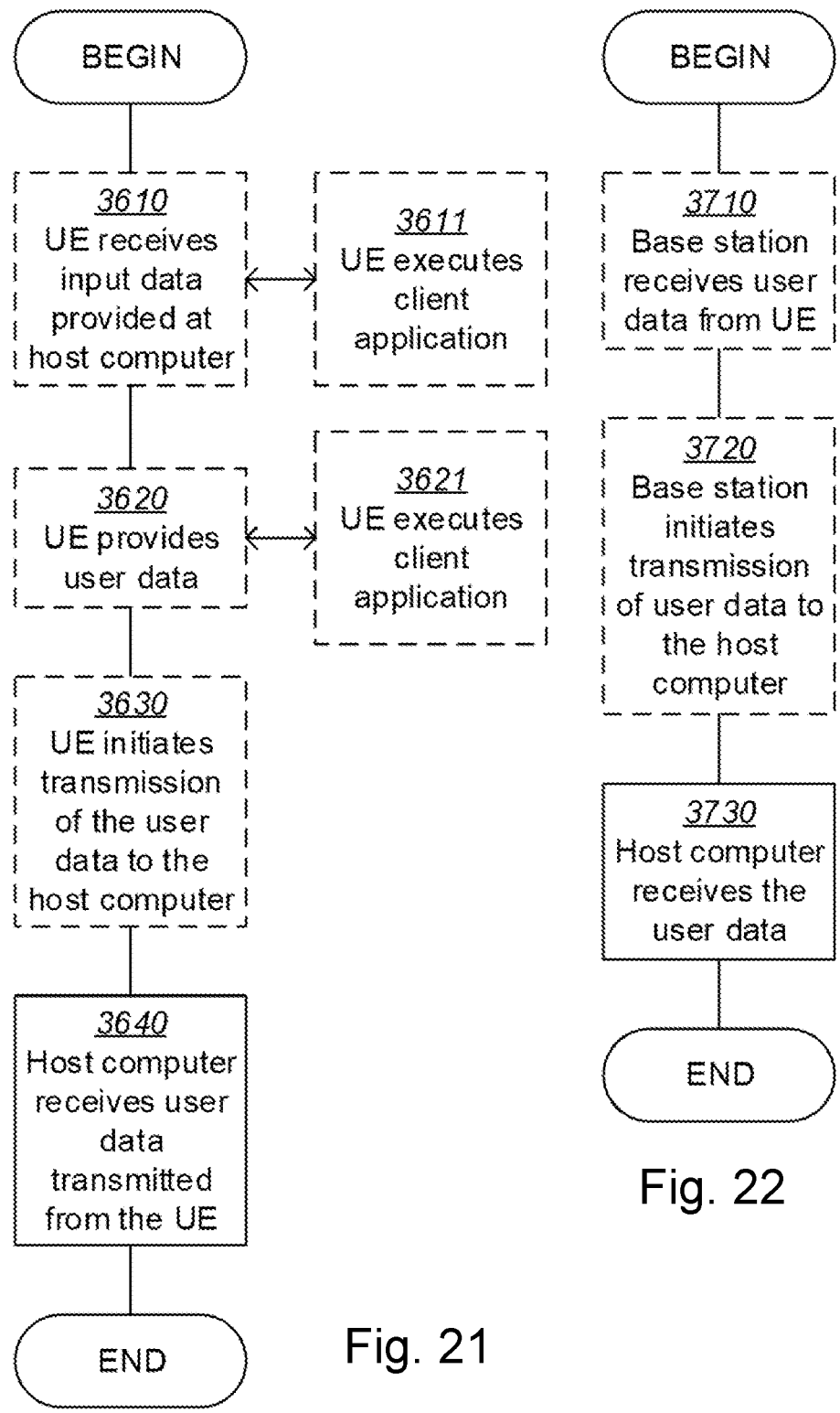

NETWORK NODES AND METHODS THEREIN FOR ENABLING A SWITCH BETWEEN FEEDER LINKS FOR AN AIRBOURNE OR ORBITAL COMMUNICATION NODE IN A NON-TERRESTRIAL COMMUNICATIONS NETWORK

TECHNICAL FIELD

Embodiments herein relate to communication in a non-terrestrial communications network. In particular, embodiments herein relate to a first network node and a method therein for enabling a second feeder link to be established between a second network node and an airborne or orbital communication node in non-terrestrial communications network to handle wireless devices being served by the airborne or orbital communication node. Embodiments herein also relate to a second network node and a method therein for establishing a second feeder link towards an airborne or orbital communication node in non-terrestrial communications network to handle wireless devices being served by the airborne or orbital communication node. Further, the embodiments herein also relate to a computer program and a carrier.

BACKGROUND

Examples of non-terrestrial communications networks or Non-Terrestrial Networks, NTNs, may, for example, be defined in accordance with the standard document 3GPP TR 38.801. Here, a non-terrestrial communications network is described as a network, or segment of networks, using radio frequency, RF, resources which are typically on-board a satellite or an Unmanned Aircraft System, UAS, platform. Generally, there are two typical scenarios of a non-terrestrial communications network providing access to user equipments, UEs.

FIG. 1 shows a first scenario of a non-terrestrial communications network providing access to UEs using a transparent satellite payload. A transparent satellite payload refers to a payload that changes the frequency carrier of the uplink RF signal, filters and amplifies it before transmitting it on the downlink, DL. Since this only comprises radio frequency filtering, frequency conversion and amplification, the waveform signal repeated by the transparent satellite payload is un-changed. FIG. 2 shows a second scenario of a non-terrestrial communications network providing access to UEs using a regenerative satellite payload. A regenerative satellite payload refers to a payload that transforms and amplifies an uplink RF signal before transmitting it on the DL. Here, the transformation of the RF signal refers to digital processing that may include demodulation, decoding, re-encoding, re-modulation, and/or filtering. Hence, the waveform signal repeated by the regenerative satellite payload is changed. This is effectively equivalent to having all or part of base station functions (e.g. gNB) on board the satellite/UAS platform.

As shown in FIGS. 1-2, a Non-Terrestrial Network, NTN, may comprise the following elements:

One or several satellite gateways, i.e. sat-gateways or satellite GWs, that connect the NTN to a public data network;

A Feeder Link, FL, which also may be referred to as simply a radio link, between a sat-gateway, GW, and a satellite/UAS platform;

A satellite/UAS platform which may implement either a transparent payload or a regenerative payload (i.e. with on board processing of the payload). The satellite/UAS platform may typically generate several beams over a given service area bounded by its field of view. The footprints of the beams are typically of elliptic shape. The field of view of a satellite/UAS platform, may depend on the on-board antenna diagram, orbital height and minimum elevation angle.

A Service Link, SL, which also may be referred to as simply a radio link, between the UEs and the satellite/UAS platform;

Optionally, in case of a constellation of satellites, Inter-Satellite Links, ISL, may be used, as shown in FIG. 2. This will require regenerative payloads on-board the satellites/UAS platforms. ISL may operate in RF frequency or optical bands;

UEs are served by the satellite/UAS platform within the targeted service area. The targeted service area is shown in FIGS. 1-2 as a collection of beam foot prints in the field of view of the satellite/UAS platform.

Here, the satellite/UAS platform may be a geostationary, GEO, satellite that is fed by the one or several satellite GWs. The satellite GWs may be deployed across the satellite targeted coverage, e.g. regional or even continental coverage. For example, UEs in a cell may be served by only one satellite GW. Alternatively, the satellite/UAS platform may be a non-GEO satellite, such as, e.g. a Low Earth Orbit, LEO, satellite, served by the one or several satellite GWs. Service and feeder link continuity between the successive serving sat-gateways is ensured with enough time to proceed with mobility anchoring and hand-over.

The NG-RAN logical architecture as described in the standard document 3GPP TS 38.401 may be used as baseline for NTN scenarios.

FIG. 3 shows one example of an NTN comprising a transparent satellite-based NG-RAN architecture. In this case, the satellite payload implements, i.e. is configured to perform, frequency conversion and a RF amplifier in both the UL and DL direction; in other words, the satellite corresponds to an RF repeater. This means that the satellite repeats the NR-Uu radio interface from the feeder link, i.e. the radio link between the NTN gateway and the satellite, to the service link, i.e. the radio link between the satellite and the UEs, and vice versa. Further, more than one gNB may access a single satellite payload. Also, in this case, the NTN gateway and the satellite may be seen as a remote radio unit, RRU, within the Radio Access Network, RAN, of the NTN. Furthermore, in the NTN, the gNB may communicate with the core network, 5G CN, over a NG interface, whereby the core network may communicate with a data network over a N6 interface. It should further be noted that, here, the Satellite Radio Interface, SRI, on the feeder link is the NR-Uu. In other words, the satellite does not terminate NR-Uu.

FIG. 4 shows one example of an NTN comprising a regenerative satellite-based NG-RAN architecture. In this case, the satellite payload may implement gNB processing and regeneration of the signals received from earth. Here, the NR-Uu radio interface is only employed on the service link between the UE and the satellite, whereas the feeder link between the NTN gateway and the satellite employ a SRI. The SRI is a transport link between NTN GW and satellite. Also, in this case, the satellites with the gNB processing payloads may be seen as the RAN of the NTN. The satellite payload also provides ISLs between satellites.

ISL is a transport link between satellites, and it may, for example, be a radio interface or an optical interface.

FIG. 5 shows another example of an NTN comprising a regenerative satellite-based NG-RAN architecture. However, in this case, the satellite payload may implement gNB-DU processing and regeneration of the signals received from earth. Here, the NR-Uu radio interface is on the service link between the satellite and the UE. The SRI is on the feeder link between the NTN gateway and the satellite. The SRI may here transport the F1 interface. The satellite payload may also provide ISLs between satellites. The gNB-DUs on-board different satellites may be connected to the same gNB-CU on the ground. If the satellite hosts more than one gNB-DU, the same SRI may transport all the corresponding F1 interface instances.

Furthermore, for New Radio, NR, reference signals, cell-defining synchronization signal blocks, CD-SSB, and non-cell defining SSB, non-CD-SSB, are used. These are relevant in regard to mobility and described in more detail below with reference to FIG. 6.

Two types of synchronization signal blocks, SSBs, may be transmitted in NR. The SSB that has an associated SIB1 being transmitted is referred to as a cell-defining SSB, CD-SSB, and the SSB that do not have an associated SIB1 being transmitted is referred to as non-CD-SSB. The Physical Cell-ID, PCI, i.e. the content of the SSS of the SSBlock, used in the non-CD-SSB may be different from that of the PCI used in CD-SSB. The CD-SSB is always associated with a unique cell-ID.

There currently exist certain challenge(s). For example, there is a need to be able to seamlessly switch a satellite link between two ground stations without affecting service to the UEs served on the ground.

SUMMARY

It is an object of embodiments herein to enable seamless switching of the feeder link between two network nodes without affecting the service to the UEs being served on the ground in a non-terrestrial communications network.

According to a first aspect of embodiments herein, the object is achieved by a method performed by a first network node for enabling a second feeder link to be established between a second network node and an airborne or orbital communication node in non-terrestrial communications network to handle wireless devices being served by the airborne or orbital communication node. The first network node is handling the wireless devices served by the airborne or orbital communication node over a first feeder link between the first network node and the airborne or orbital communication node. The method comprises determining that the wireless devices served by the airborne or orbital communication node are to be handled by the second network node over the second feeder link. Also, the method comprise initiating the second feeder link to be established between the second network node and the airborne or orbital communication node.

According to a second aspect of embodiments herein, the object is achieved by a first network node for enabling a second feeder link to be established between a second network node and an airborne or orbital communication node in non-terrestrial communications network to handle wireless devices being served by the airborne or orbital communication node. The first network node is handling the wireless devices served by the airborne or orbital communication node over a first feeder link between the first network node and the airborne or orbital communication node. The first network node is configured to determine that the wireless devices served by the airborne or orbital communication node are to be handled by the second network node over the second feeder link. Also, the first network node is configured to initiate the second feeder link to be established between the second network node and the airborne or orbital communication node.

According to a third aspect of embodiments herein, the object is achieved by a method performed by a second network node for establishing a second feeder link towards an airborne or orbital communication node in non-terrestrial communications network to handle wireless devices being served by the airborne or orbital communication node. The first network node is handling the wireless devices served by the airborne or orbital communication node over a first feeder link between the first network node and the airborne or orbital communication node. The method comprises determining that the wireless devices served by the airborne or orbital communication node are to be handled by the second network node over the second feeder link. Also, the method comprises establishing the second feeder link towards the airborne or orbital communication node.

According to a fourth aspect of embodiments herein, the object is achieved by a second network node for establishing a second feeder link towards an airborne or orbital communication node in non-terrestrial communications network to handle wireless devices being served by the airborne or orbital communication node. The first network node is handling the wireless devices served by the airborne or orbital communication node over a first feeder link between the first network node and the airborne or orbital communication node. The second network node is configured to determine that the wireless devices served by the airborne or orbital communication node are to be handled by the second network node over the second feeder link. The second network node is also configured to establish the second feeder link towards the airborne or orbital communication node.

According to a fifth aspect of the embodiments herein, a computer program is also provided configured to perform the method described above. Further, according to a sixth aspect of the embodiments herein, carriers are also provided configured to carry the computer program configured for performing the method described above.

By determining and initiating a handover from a first network node to second network node and by determining and establishing the handover in the second network node as described above, the second network node is able to access the airborne or orbital communication node before, for example, feeder link maintenance, traffic offloading or visibility loss, starts, and overlay a new set of cells on the UEs being served by the first network node via the airborne or orbital communication node, so that a seamless handover from the first network node to the second network node may be performed.

BRIEF DESCRIPTION OF THE DRAWINGS

Features and advantages of the embodiments will become readily apparent to those skilled in the art by the following detailed description of exemplary embodiments thereof with reference to the accompanying drawings, wherein:

FIG. 7 is a flowchart depicting embodiments of a method in a first network node, FIG. 8 is another flowchart depicting embodiments of a method in a second network node.

FIGS. 19-22 are flowcharts illustrating methods implemented in a communication system including a host computer, a base station and a user equipment.

DETAILED DESCRIPTION

Figure 1:
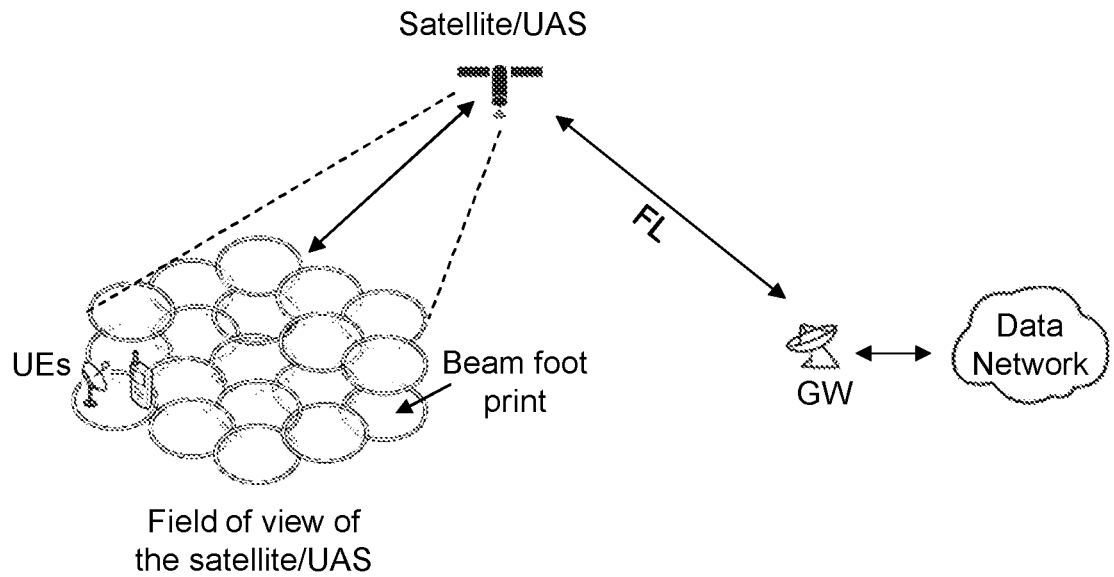
FIG. 1 is a schematic block diagrams illustrating a non-terrestrial communications network providing access to user equipments using a transparent satellite payload.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The figures are schematic and simplified for clarity, and they merely show details which are essential to the understanding of the embodiments presented herein, while other details have been left out. Throughout, the same reference numerals are used for identical or corresponding parts or steps.

As part of the developing of the embodiments described herein, it has been realized that, during satellite operation, it may become necessary to switch the feeder link, e.g. SRI, between NTN GWs to the same satellite. This may be due to e.g. maintenance or traffic offloading. Alternatively, in the case of LEO satellites (which move with respect to Earth), this may also be due to the satellite moving out of sight with respect to its current NTN GW. This switch in feeder link may potentially cause a major service disruption and packet loss over the network interfaces, such as, e.g. F1, NG and Xn interfaces, to the UEs served by the satellite that is switching its feeder link. Changing the connection to a different AMF and/or gNB-CU as a hard switch would require tearing down the corresponding NG and/or F1 interface and setting it up again to the new node, and this would cause the connection to all served UEs to be dropped.

By determining and initiating a handover from a first network node to second network node and by determining and establishing the handover in the second network node as described above, the second network node is able to access the airborne or orbital communication node before, for example, feeder link maintenance or traffic offloading, starts, and overlay a new set of cells on the UEs being served by the first network node via the airborne or orbital communication node, so that a seamless handover from the first network node to the second network node may be performed.

In more detail, according to some embodiments, the link switchover leverages the NG-RAN logical architecture as specified by the 3GPP standard, mapped onto the three (3) NTN-based architectures as described in background above.

Figure 3:
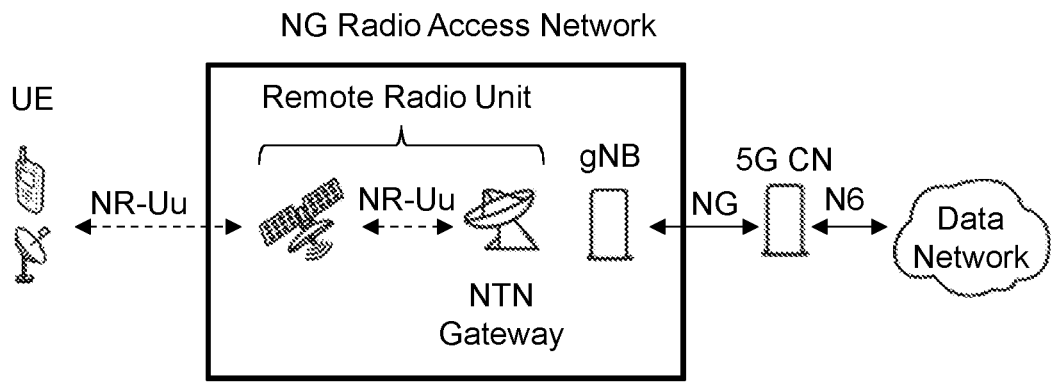
FIG. 3 is a schematic block diagram illustrating transparent satellite-based NG-RAN architecture.

First, for the transparent satellite-based NG-RAN architecture shown in FIG. 3 with LEO satellites, the second network node, i.e. new ground station or new gNB, may access the airborne or orbital communication node, i.e. the LEO satellite, before the airborne or orbital communication node loses visibility with the first network node, i.e. old ground station or old gNB. This requires some overlap, but enables the second network node to overlay a new set of cells on the UEs on the ground through the airborne or orbital communication node so that the UEs may be handed over from the first network node to the second network node, i.e. from the old ground station/gNB to the new ground station/gnB.

Figure 4:
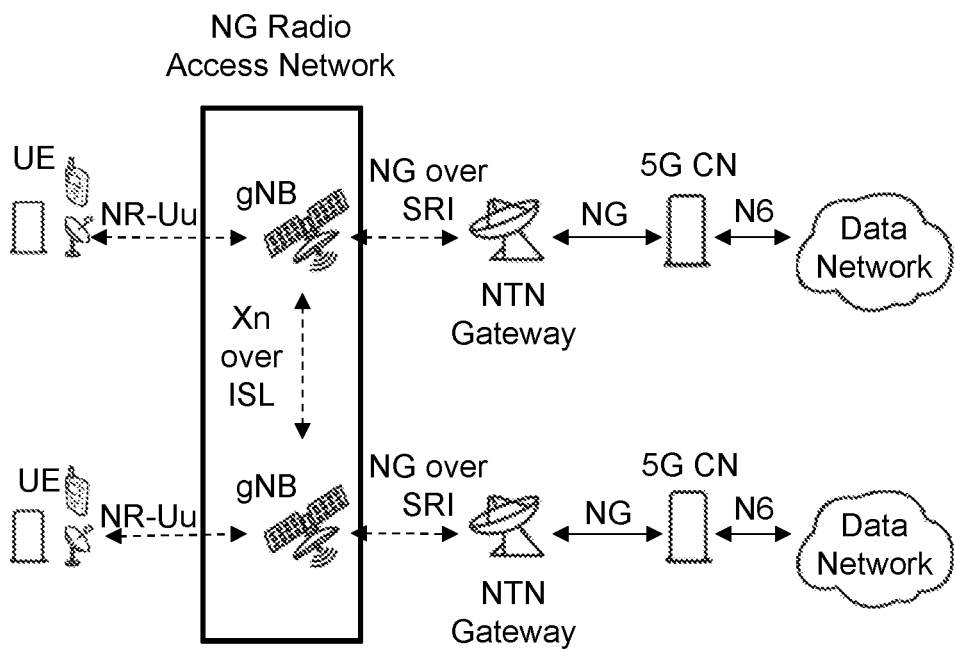
FIG. 4 is a schematic block diagram illustrating a first regenerative satellite-based NG-RAN architecture.

Secondly, for the regenerative satellite-based NG-RAN architecture shown in FIG. 4 with GEO satellites, the second network node, i.e. new ground station or new gNB, may access the airborne or orbital communication node, i.e. the LEO satellite, before feeder link maintenance or traffic offloading starts. This enables the second network node to overlay a new set of cells on the UEs on the ground through the airborne or orbital communication node so that the UEs may be handed over from the first network node to the second network node, i.e. from the old ground station/gNB to the new ground station/gnB.

In the latter case, the feeder link switch may comprise the addition/removal of an Stream Control Transmission Protocol, SCTP, association between the logical node on the ground and the logical node on-board the satellite. This may be aided by additional information exchanged over the Radio Network Layer, RNL, layer.

Furthermore, in some embodiments, it may be possible to avoid service interruption to the UEs when switching satellites from one ground station to another. This is particularly critical for LEO constellations, where satellites move with respect to Earth, and which may cause frequent switchovers, network reconfigurations and/or UE handovers.

Examples of embodiments of a method performed by a first network node 101 for enabling a second feeder link 132 to be established between a second network node 102 and an airborne or orbital communication node 101 in non-terrestrial communications network 100 to handle wireless devices 121 being served by the airborne or orbital communication node 110, wherein the first network node 101 is handling the wireless devices 121 served by the airborne or orbital communication node 110 over a first feeder link 131 between the first network node 101 and the airborne or orbital communication node 110, will now be described with reference to the flowchart depicted in FIG. 7.

Figure 23:
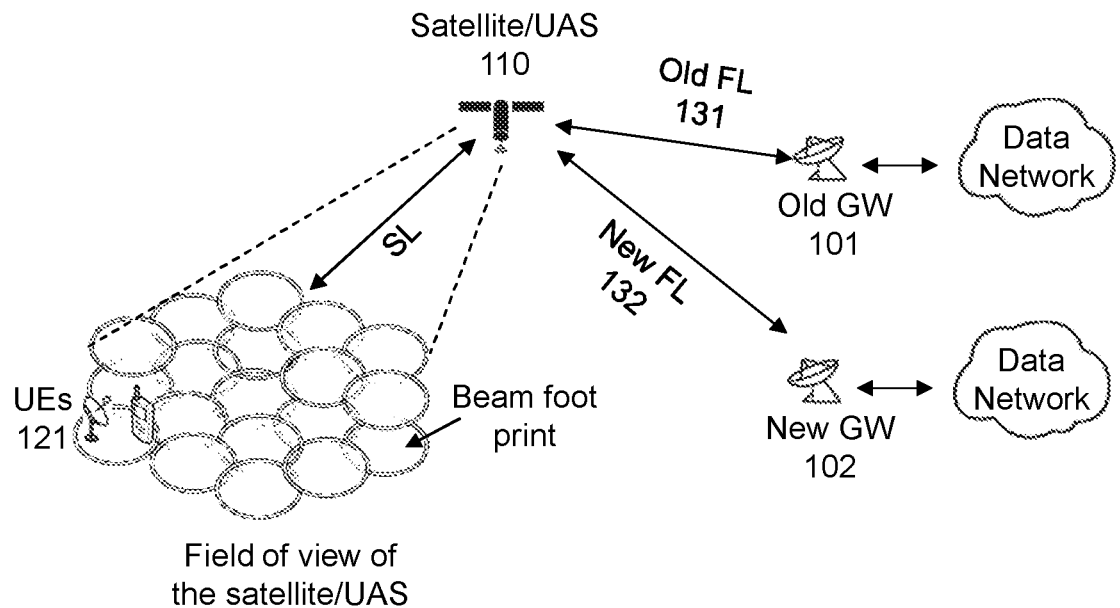
FIG. 23 is a schematic block diagram illustrating a non-terrestrial communications network providing access to user equipments while switching feeder link of an airborne or orbital communications node according to some embodiments.
Figure 24:
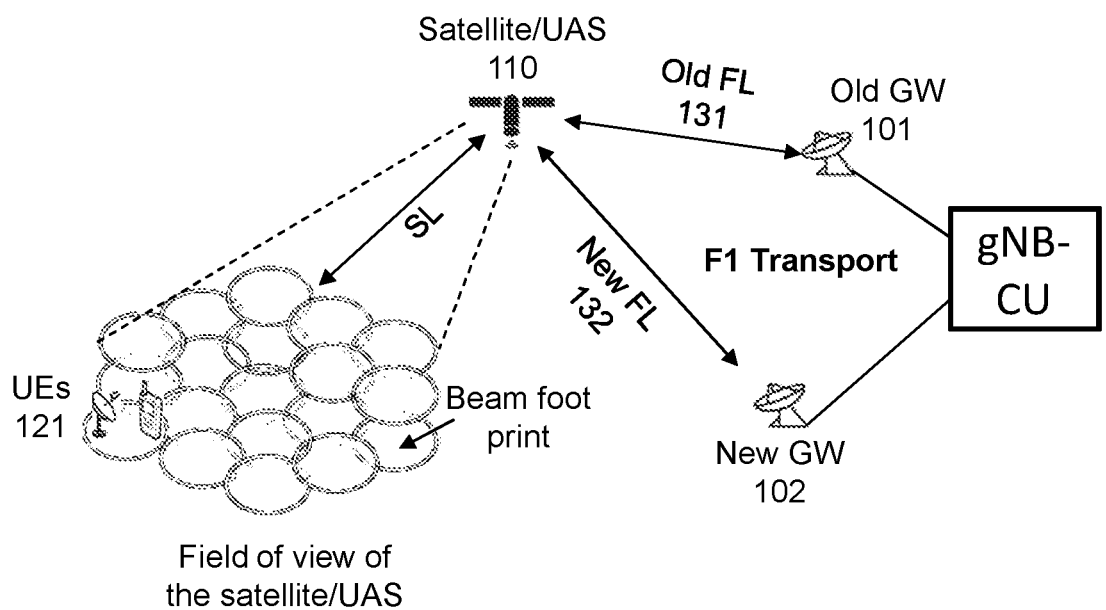
FIG. 24 is another schematic block diagram illustrating a non-terrestrial communications network providing access to user equipments while switching feeder link of an airborne or orbital communications node according to some embodiments.
Figure 25:
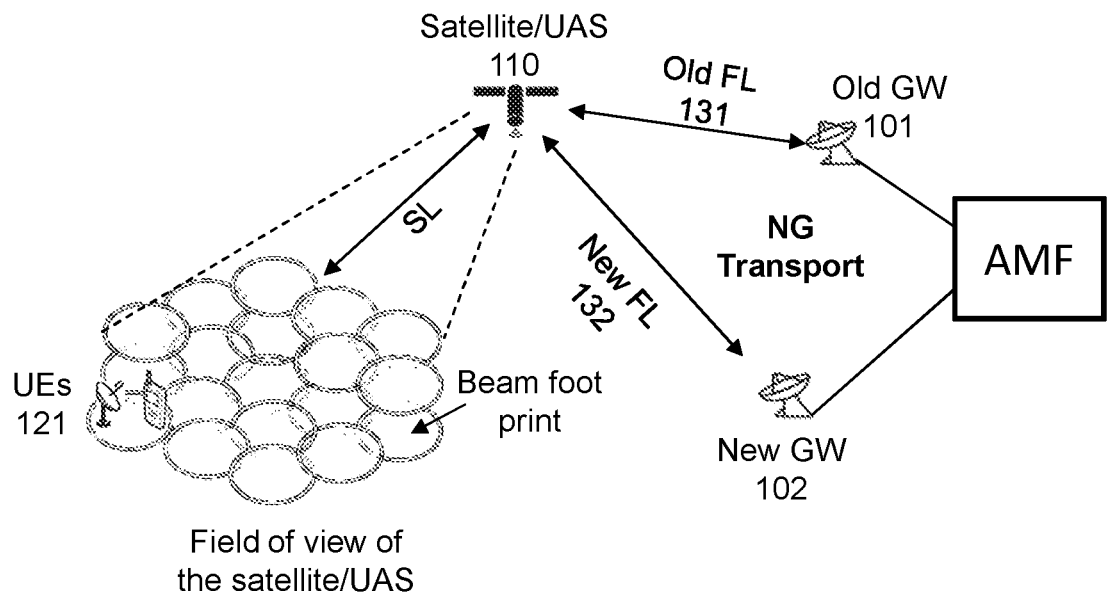
FIG. 25 is yet another schematic block diagram illustrating a non-terrestrial communications network providing access to user equipments while switching feeder link of an airborne or orbital communications node according to some embodiments.

FIG. 7 is an illustrated example of actions or operations which may be taken by the first network node 101 in the non-terrestrial communications network 100 illustrated in FIGS. 23-25. The method may comprise the following actions.

Action 701

The first network node 101 determines that the wireless devices served by the airborne or orbital communication node 110 are to be handled by the second network node 102 over the second feeder link 132. This means, for example, that the first network node 101 may detect that a change from the first feeder link 131 to the second feeder link 132 is required for the airborne or orbital communication node 101. This may, for example, be due to the airborne or orbital communication node 110 moving away from the first network node 101 and towards the second network node 102. Optionally, this may be due to the start of traffic off-loading being performed for the feeder link 131, or feeder link maintenance.

In other words, the first network node, e.g. a gNB or base station, determines that the wireless devices, UEs, served by an airborne or orbital communication node, e.g. a satellite or an Unmanned Aerial System (UAS) platform, are to be handled by a second network node, e.g. a gNB or base station, over the second feeder link. This may, for example, be performed by the first network node by detecting a change in the first feeder link is required, e.g. due to airborne or orbital communication node moving towards the second network node, traffic offloading from the first feeder link, or feeder link maintenance of the first feeder link.

Action 702

After receiving the determination in Action 701, the first network node 101 initiates the second feeder link 132 to be established between the second network node 102 and the airborne or orbital communication node 110. This means, for example, that the first network node 101 may begin performing the handover of the wireless devices 121 being served by the airborne or orbital communication node 110 before, e.g. the airborne or orbital communication node 110 has moved to far away from the first network node 101, the start of traffic off-loading being performed for the feeder link 131, or feeder link maintenance, which e.g. may depend on the relevant NG-RAN architecture as described above. In some embodiments, the initiation of the second feeder link 132 to be established between the second network node and the airborne or orbital communication node, may also comprise actually establishing the second feeder link 132 towards the airborne or orbital communication node 132. This may, for example, be performed in a regenerative architecture, wherein the switch from the first feeder link 131 to the second feeder link 132 comprises the addition/removal of an SCTP association between the logical node on the ground, e.g. CU-gNB, and the one on the satellite, e.g. DU-gNB, aided by additional information exchanged therein between over the RNL layer.

In some embodiments, the first network node 101 may transmit, to the second network node 102, information indicating that the second network node 102 is to establish the second feeder link 132 towards the airborne or orbital communication node 110 in order to handle wireless devices 121 being served by the airborne or orbital communication node 110. This means, for example, that the first network node 101 may transmit a message to the second network node 102. In some embodiments, the message may be a SATELLITE CONNECTION REQUEST message to the second network node 102 over the Xn interface. The information may comprise the relevant information on the airborne or orbital communication node 110. In some embodiments, this relevant information may comprise, but not being limited to, one or more of:

- an identifier of the airborne or orbital communication node 110 (i.e. the satellite identifier)
- a position of the airborne or orbital communication node 110 (i.e. the satellite position),
- information indicating the served cell(s) that the first network node 101 is providing through the airborne or orbital communication node 110 (e.g. list of served cell(s) that the first network node 101 is providing through the airborne or orbital communication node 110, e.g. their cell IDs/PCIs),
- CD-SSB frequency locations,
- context information relating to the airborne or orbital communication node (110); and
- a handover message, i.e. HO request, for each wireless device 121 served by the first network node 101 (which, in some embodiments may be included already in this stage).

In some embodiments, the first network node 101 may receive, from the second network node 102, information indicating that the second network node 102 has established the second feeder link 132 towards the airborne or orbital communication node 110 in order to handle wireless devices 121 being served by the airborne or orbital communication node 110. This means, for example, that the first network node 101 may receive a message from the second network node 102. In some embodiments, the message may be a SATELLITE CONNECTION REQUEST ACKNOWLEDGMENT message from the second network node 102 over the Xn interface. This message may comprise, for example, the list of served cell(s) that the second network node 102 is now providing through the satellite, such as, e.g. their cell IDs/PCIs. In this case, the first network node 101 may also initiate a handover procedure of the wireless devices 121 served by the airborne or orbital communication node 110 from the first network node 101 to the second network node 102. This means, for example, that the first network node 101 may transmit an handover message, e.g. a HO REQUEST message, to the second network node 102 for each of the wireless devices 121 served by the first network node 101, and thus trigger the handover of the served wireless device 121 to the second network node 102. Further, the first network node 101 may then terminate the first feeder link 131 between the first network node 101 and the airborne or orbital communication node 110. This may be performed after having completed the handover procedure to the second network node 102.

Examples of embodiments of a method performed by a second network node 102 for establishing a second feeder link 132 towards an airborne or orbital communication node 110 in non-terrestrial communications network 100 to handle wireless devices 121 being served by the airborne or orbital communication node 110, wherein a first network node 101 is handling the wireless devices served by the airborne or orbital communication node over a first feeder link 131 between the first network node 101 and the airborne or orbital communication node 110, will now be described with reference to the flowchart depicted in FIG. 8. FIG. 8 is an illustrated example of actions or operations which may be taken by the second network node 102 in the non-terrestrial communications network 100 illustrated in FIGS. 23-25. The method may comprise the following actions.

Action 801

The second network node 102 determines that the wireless devices 121 served by the airborne or orbital communication node 110 are to be handled by the second network node 102 over the second feeder link 132. This means, for example, that the second network node 101 may detect that a change from the first feeder link 131 of the first network node 101 to a second feeder link 132 of the second network node 102 is required for the airborne or orbital communication node 101. In other words, the second network node, e.g. a gNB or base station, determines that the wireless devices, UEs, served by an airborne or orbital communication node, e.g. a satellite or an Unmanned Aerial System (UAS) platform, are to be handled by the second network node, e.g. a gNB or base station, over the second feeder link.

In some embodiments, the second network node 101 may receive, from the first network node 101, information indicating that the second network node 102 is to establish the second feeder link 132 towards the airborne or orbital communication node 110 in order to handle wireless devices 121 being served by the airborne or orbital communication node 110. This means, for example, that the second network node 102 may receive a message from the first network node 101. In some embodiments, the message may be a SATELLITE CONNECTION REQUEST message from the first network node 101 over the Xn interface. The information may comprise the relevant information on the airborne or orbital communication node 110. In some embodiments, this relevant information may comprise, but not being limited to, one or more of:

an identifier of the airborne or orbital communication node 110 (i.e. the satellite identifier)

a position of the airborne or orbital communication node 110 (i.e. the satellite position), information indicating the served cell(s) that the first network node 101 is providing through the airborne or orbital communication node 110 (e.g. list of served cell(s) that the first network node 101 is providing through the airborne or orbital communication node 110, e.g. their cell IDs/PCIs), CD-SSB frequency locations, and a handover message, i.e. HO request, for each wireless device 121 served by the first network node 101 (which, in some embodiments may be included already in this stage).

Action 802

After the determination in Action 801, the second network node 102 establishes the second feeder link 132 towards the airborne or orbital communication node 110. This means, for example, that the second network node 102 may begin performing the handover of the wireless devices 121 being served by the airborne or orbital communication node 110 before, e.g. the airborne or orbital communication node 110 has moved to far away from the first network node 101, the start of traffic off-loading being performed for the feeder link 131 or feeder link maintenance, which e.g. may depend on the relevant NG-RAN architecture as described above.

In some embodiments, the second network node 102 may configure the second network node 102 for handling the wireless devices 121 being served by the airborne or orbital communication node 110. This means, for example, that the second network node 102 may connect to the airborne or orbital communication node 110 and overlay its cell(s) on the coverage of the first network node 101. This also means that the second network node 102 may take into account information provided by the first network node 101 regarding e.g. the served cell(s) of the first network node 101, when configuring its own cell(s) for service through the airborne or orbital communication node 110.

In this case, according to some embodiments, the second network node 102 may then transmit, to the first network node 101, information indicating that the second network node 102 has established the second feeder link 132 towards the airborne or orbital communication node 110 in order to handle the wireless devices 121 being served by the airborne or orbital communication node 110. This means, for example, that the second network node 102 may transmit a message to the first network node 101. In some embodiments, the message may be a SATELLITE CONNECTION REQUEST ACKNOWEDGMENT message to the first network node 101 over the Xn interface. Here, according to some embodiments, the information comprises the served cell(s) that the second network node 102 is providing through the airborne or orbital communication node 110. This may, for example, be a list of served cell(s) that the second network node 102 is now providing through the airborne or orbital communication node 110. In some embodiments, the served cell(s) that the first network node 101 is providing through the airborne or orbital communication node 110 may be indicated via their cell IDs/PCIs.

Figure 9:
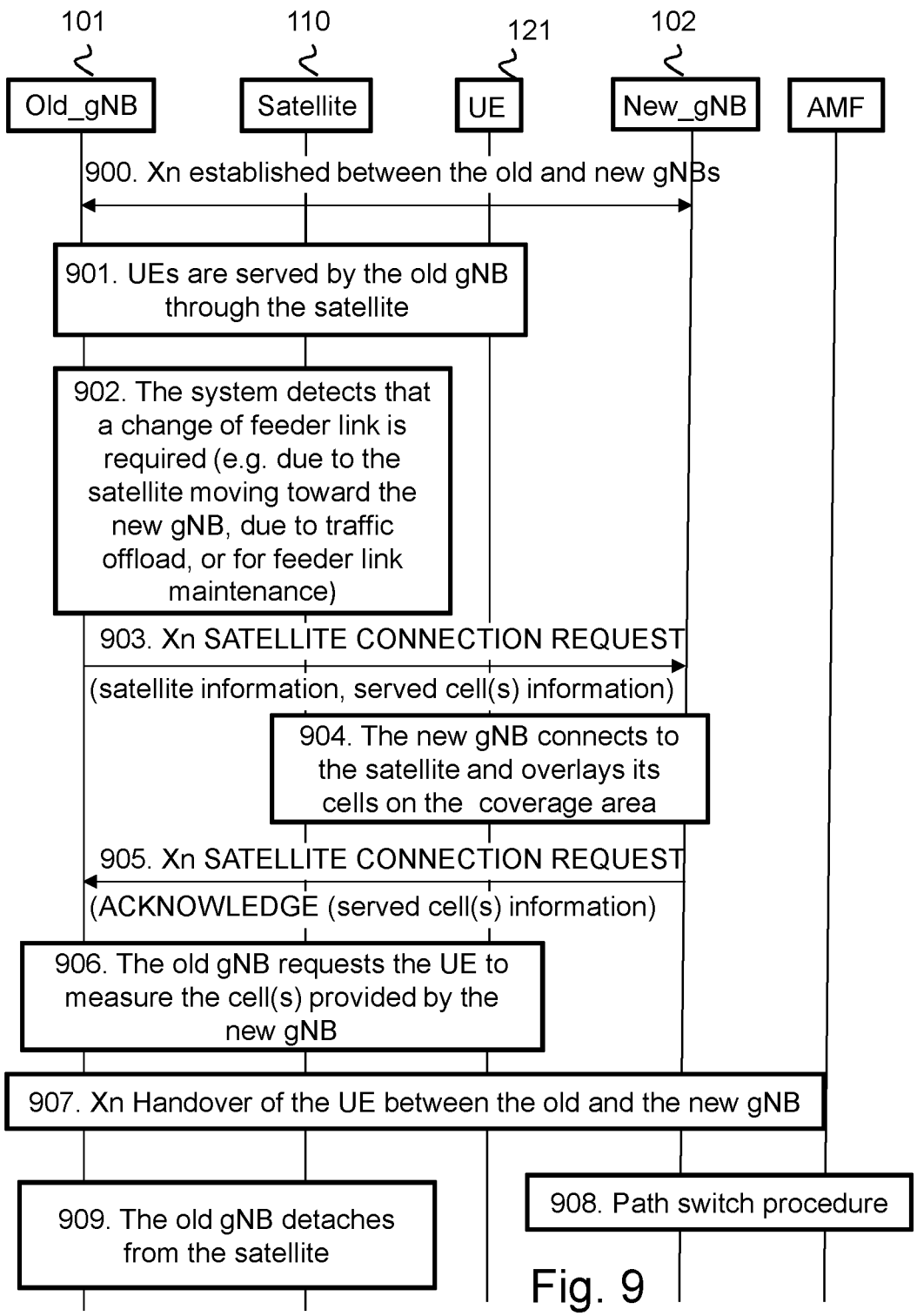
FIG. 9 is signalling diagram depicting embodiments of methods in a first and a second network node.

FIG. 9 shows a signalling diagram depicting embodiments of methods in the first network node 101 and the second network node 102 in more detail.

In Action 900, the first network node 101 and the second network node 102 may establish an Xn interface connection. In Action 901, the first network node 101 is serving the wireless devices 121 via the airborne or orbital communication node 110. In Action 902, the first network node 101, or a system comprising the first network node 101, may detect that a change of feeder link is required. This may, for example, be due to the airborne or orbital communication node 110, i.e. the satellite, moving towards the second network node 102, due to traffic off-load, or due to feeder link maintenance being initiated. In other words, the old gNB, i.e. the first network node 101, may detect that the satellite, i.e. the airborne or orbital communication node 110, is moving towards the new gNB, i.e. the second network node 102, through e.g. telemetry, position/GPS, radio link measurements, etc. Optionally, this may be known by as ephemeris data in the network. Alternatively, before feeder link maintenance or start of traffic offloading, the old gNB may be asked to hand over all or some of the UEs to the new gNB. Here, it should be noted that the above detection could also be triggered by the satellite. In Action 903, the first network node 101 may transmit a SATELLITE CONNECTION REQUEST message over the established Xn interface to the second network node 102. The message may comprise e.g. satellite information and served cell(s) information. In other words, the old gNB signals to the new gNB via the Xn SATELLITE CONNECTION REQUEST that the should connect to the satellite. The old gNB may include in the message the relevant information on the satellite including, but not limited to, the satellite identifier and position and the list of served cell(s) that the old gNB is providing through the satellite (i.e. their cell IDs/PCIs), CD-SSB frequency locations, and optionally already in this stage the HO REQUEST message for each of the UE served by the old gNB. In Action 904, the second network node 102 may connect to the airborne or orbital communication node 110 and overlay its cell(s) on the coverage area of the first network node 101. In other words, the new gNB may connect to the satellite and overlay its cell(s) on the coverage area of the old gNB. The new gNB may take into account the served cell information provided by the old gNB when configuring its own cells for service through the satellite. In some embodiments, the new gNB may start transmitting the CD-SSBs of its cells on synchronization raster points that are different from those of the old gNB. Here, it should also be noted that the cell DL bandwidth may be common or overlapping as presented in the standard document 3GPP 38.300. In Action 905, the second network node 102 may transmit a SATELLITE CONNECTION REQUEST ACKNOWLEDGEMENT message over the established Xn interface to the first network node 101. In other words, new gNB replies to the old gNB with the Xn SATELLITE CONNECTION REQUEST ACKNOWLEDGE, and may include the list of served cell(s) it is providing through the satellite (i.e. their cell IDs/PCIs). Optionally, in Action 906, the first network node 101 may request the wireless devices 121 to measure the cell(s) provided by the second network node 102. In other words, the old gNB may request the served UE to measure the cell(s) provided by the new gNB. In Action 907, the first network node 101 may perform a handover of the wireless devices 121 from the first network node 101 to the second network node 102. In other words, the old gNB may trigger the Xn handover of the served UE to the new gNB. In some embodiments, in Action 908, the handover procedure may trigger a path switch procedure in an Access Management Function, AMF. In other words, a path switch procedure may triggered between the new gNB and the AMF, concluding the Xn handover. In Action 907, the first network node 101 may detaches from the airborne or orbital communication node 110, e.g. by ending the feeder link 131. In other words, the old gNB detaches from the satellite.

Satellite Connection

Additional details of the satellite connection procedure according to some embodiments are given below with reference to FIGS. 10-11. The Information Element, IE, references point to the standard document 3GPP TS 38.423. Here, it should be noted that the purpose of the satellite connection procedure is to request the second network node 102, i.e. the new NG-RAN node, to connect to the specified satellite. The satellite connection procedure uses non-UE-associated signalling.

Figure 10:
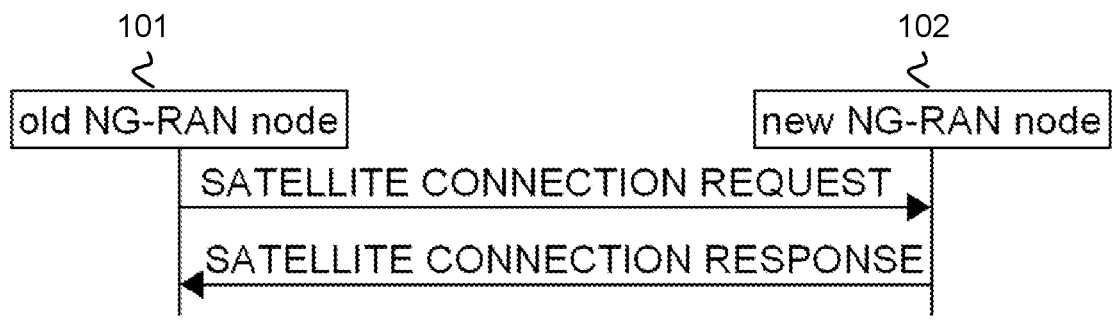
FIGS. 10-11 are signalling diagrams depicting embodiments of methods in a first and a second network node.

FIG. 10 shows a signalling diagram depicting embodiments of methods in the first network node 101 and the second network node 102. The signalling diagram further depicts a successful operation of the satellite connection procedure. Here, the old NG-RAN node, i.e. the first network node 101, may initiate the procedure by sending the SATELLITE CONNECTION REQUEST message to the new NG-RAN node, i.e. the second network node 102. If the new NG-RAN node is able to connect to the specified satellite, it shall respond to the old NG-RAN node with the SATELLITE CONNECTION RESPONSE message.

One example of a SATELLITE CONNECTION REQUEST is described below.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Satellite Information | M | | 9.2.2.x | | YES | reject |
| List of Served Cells through the Satellite | | 0 ... <maxnoofCellsthroughSatellite> | | Complete list of cells served by the gNB through the satellite | YES | reject |
| >Served Cell Through Satellite Information NR | M | | Served Cell Information NR 9.2.2.11 | | — | |
| Criticality Diagnostics | O | | 9.2.3.3 | | YES | ignore |

-continued

| Range bound | Explanation |
| --- | --- |
| maxnoofCellsthroughSatellite | Maximum no. of cells that can be served through a satellite. Value is 16384. |

This SATELLITE CONNECTION REQUEST message may be sent by the old NG-RAN node to request to the new NG-RAN node to connect to the specified satellite. Direction: old NG-RAN node→new NG-RAN node.

One example of a SATELLITE CONNECTION RESPONSE is described below.

| IE/Group Name | Presence | Range | IE type and reference | Semantics description | Criticality | Assigned Criticality |
| --- | --- | --- | --- | --- | --- | --- |
| Message Type | M | | 9.2.3.1 | | YES | reject |
| List of Served Cells through the Satellite | | 0 ... <maxnoofCellsthroughSatellite> | | Complete list of cells served by the gNB through the satellite | YES | reject |
| >Served Cell Through Satellite Information NR | M | | Served Cell Information NR 9.2.2.11 | | — | |
| Criticality Diagnostics | O | | 9.2.3.3 | | YES | ignore |

| Range bound | Explanation |
| --- | --- |
| maxnoofCellsthroughSatellite | Maximum no. of cells that can be served through a satellite. Value is 16384. |

This SATELLITE CONNECTION RESPONSE message may be sent by the new NG-RAN node to inform the old NG-RAN node about successful connection to the specified satellite. Direction: new NG-RAN node→old NG-RAN node.

Figure 11:
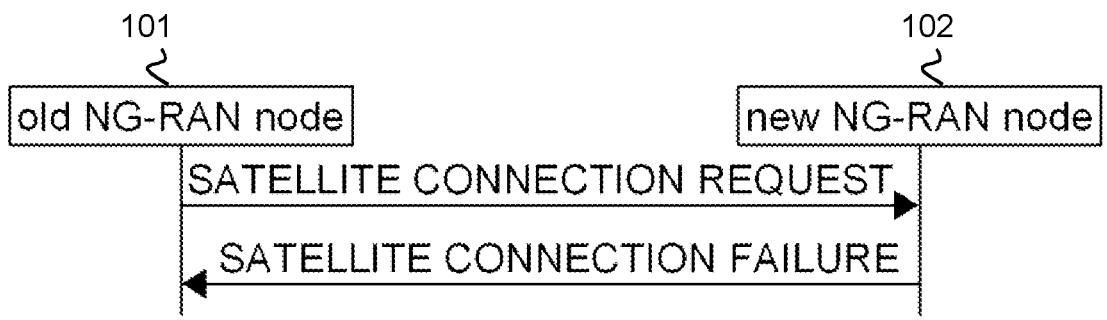

FIG. 11 shows another signalling diagram depicting embodiments of methods in the first network node 101 and the second network node 102. The signalling diagram further depicts an unsuccessful operation of the satellite connection procedure. Here, if the new NG-RAN node, i.e. the first network node 101, is not able to connect to the specified satellite, it shall respond to the old NG-RAN node, i.e. the second network node 102, with the SATELLITE CONNECTION FAILURE message.

One example of a SATELLITE CONNECTION FAILURE message is described below.

| IE/Group Name | Presence | Range | IE type and reference | Semantics description | Criticality | Assigned Criticality |
| --- | --- | --- | --- | --- | --- | --- |
| Message Type | M | | 9.2.3.x | | YES | reject |
| Cause | M | | 9.2.3.2 | | YES | ignore |
| Criticality Diagnostics | O | | 9.2.3.3 | | YES | ignore |

Figure 5:
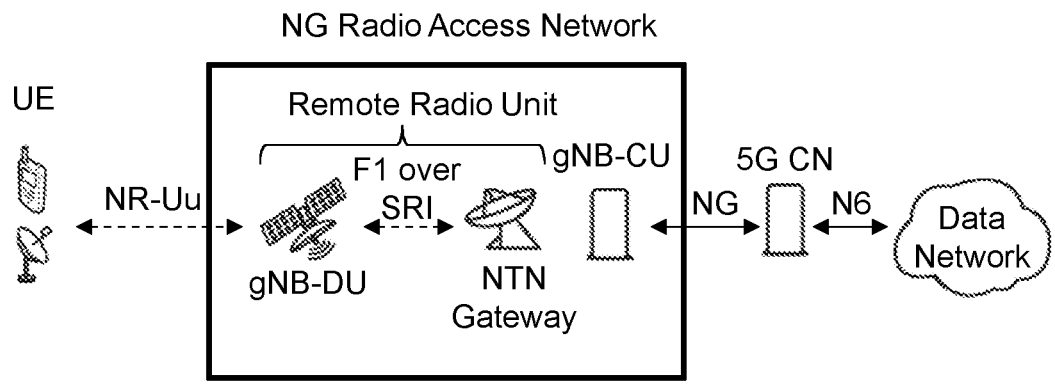
FIG. 5 is a schematic block diagram illustrating a second regenerative satellite-based NG-RAN architecture.
Figure 6:
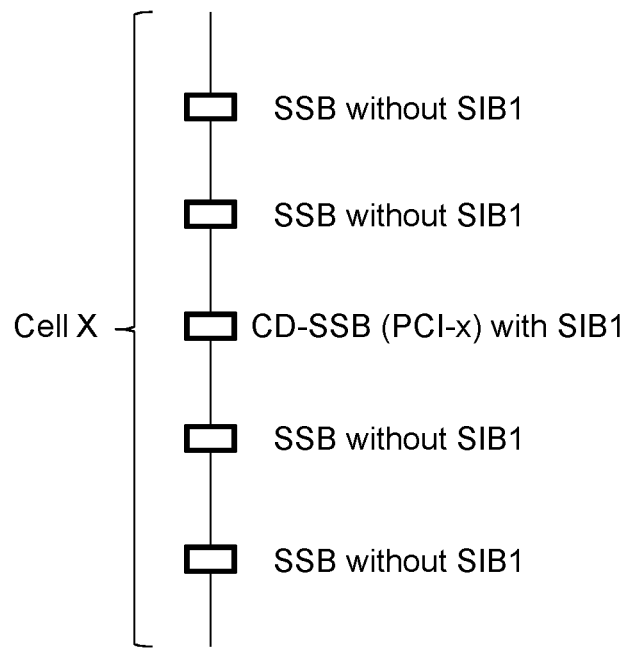
FIG. 6 is a schematic block diagram illustrating two types of synchronization signal blocks, SSBs.

Some embodiments described herein applies to the regenerative satellite-based NG-RAN architecture where a gNB is hosted on the satellite, see e.g. FIGS. 4-5. As in this case, the gNB (eNB) is on the satellite, the feeder link between the gNB and ground node (which is a physical node rather than 3GPP specified logical node) is part of the transport network, TNL, for the NG (S1) interfaces. The feeder link may be operated with the Stream Control Transmission Protocol, SCTP. Therefore, switching the feeder link is transparent to AMF/gNB or MME/eNB, and consists essentially in adding/removing additional SCTP associations between the nodes. According to current NG specifications, it is the AMF who can add/remove SCTP associations.

Thus, in order for the AMF to know that the gNB is located on a satellite, the first network node 101 and/or second network node 102, i.e. gNBs, may according to some embodiments provide the satellite-related information, such as, e.g. satellite ID, ephemeris data, in the NG SETUP REQUEST and RAN CONFIGURATION UPDATE messages. Examples of such messages are provided in the tables below. The additions with respect to current specifications are highlighted in bold font. Here, it should also be noted that the AMF may take the received information into account when configuring/reconfiguring the TNL.

One example of a NG SETUP REQUEST is described below.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Global RAN Node ID | M | | 9.3.1.5 | | YES | reject |
| RAN Node Name | O | | PrintableString (SIZE(1 . . . 150, . . .)) | | YES | ignore |
| Supported TA List | | 1 | | Supported TAs in the NG-RAN node. | YES | reject |
| >Supported TA Item | | 1 . . . <maxnoofTACs> | | | — | |
| >>TAC | M | | 9.3.3.10 | Broadcast TAC | — | |
| >>Broadcast PLMN List | | 1 | | | — | |
| >>>Broadcast PLMN Item | | 1 . . . <maxnoofBPLMNs> | | | — | |
| >>>>PLMN Identity | M | | 9.3.3.5 | Broadcast PLMN | — | |
| >>>>TAI Slice Support List | M | | Slice Support List 9.3.1.17 | Supported S-NSSAIs per TA. | — | |
| Default Paging DRX | M | | Paging DRX 9.3.1.90 | | YES | ignore |
| Satellite Information | O | | 9.3.1.x | | YES | reject |

| Range bound | Explanation |
|---|---|
| maxnoofTACs | Maximum no. of TACs. Value is 256. |
| maxnoofBPLMNs | Maximum no. of Broadcast PLMNs. Value is 12. |

This NG SETUP REQUEST message may be sent by the NG-RAN node, i.e. the first network node 101 and/or second network node 102, to transfer application layer information for an NG-C interface instance. Direction: NG-RAN node→AMF.

One example of a RAN CONFIGURATION UPDATE is described below.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| RAN Node Name | O | | PrintableString (SIZE(1 . . . 150, . . .)) | | YES | ignore |
| Supported TA List | | 0 . . . 1 | | Supported TAs in the NG-RAN node. | YES | reject |
| >Supported TA Item | | 1 . . . <maxnoofTACs> | | | — | |
| >>TAC | M | | 9.3.3.10 | Broadcast TAC | — | |
| >>Broadcast PLMN List | | 1 | | | — | |
| >>>Broadcast PLMN Item | | 1 . . . <maxnoofBPLMNs> | | | — | |
| >>>>PLMN Identity | M | | 9.3.3.5 | Broadcast PLMN | — | |
| >>>>TAI Slice Support List | M | | Slice Support List 9.3.1.17 | Supported S-NSSAIs per TA. | — | |
| Default Paging DRX | O | | Paging DRX 9.3.1.90 | | YES | ignore |
| Satellite Information | O | | 9.3.1.x | | YES | reject |

| Range bound | Explanation |
|---|---|
| maxnoofTACs | Maximum no. of TACs. Value is 256. |
| maxnoofBPLMNs | Maximum no. of Broadcast PLMNs. Value is 12. |

This RAN CONFIGURATION UPDATE message may be sent by the NG-RAN node, i.e. the first network node 101 and/or second network node 102, to transfer updated application layer information for an NG-C interface instance. Direction: NG-RAN node→AMF.

In some embodiments, the two gNBs (i.e. the first network node 101 and/or second network node 102) may exchange information about which cell(s) they serve through the satellite at Xn interface setup and node configuration update. The gNB node receiving the message, if the highlighted IEs are signalled in the message, shall then, if supported, take the included information into account. The necessary additions to current XnAP are highlighted in bold below.

One example of a XN SETUP REQUEST is described below.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Global NG-RAN Node ID | M | | 9.2.2.3 | | YES | reject |
| TAI Support List | M | | 9.2.3.20 | List of supported TAs and associated characteristics. | YES | reject |
| AMF Set Information | M | | 9.2.3.83 | List of all the AMF Sets to which the NG-RAN node belongs. | YES | reject |
| List of Served Cells NR | | 0 . . . <maxnoofCellsinNG-RANnode> | | Complete list of cells served by the gNB | YES | reject |
| >Served Cell Information NR | M | | 9.2.2.11 | | — | |
| >Neighbour Information NR | O | | 9.2.2.13 | | — | |
| >Neighbour Information E-UTRA | O | | 9.2.2.14 | | — | |
| List of Served Cells E-UTRA | | 0 . . . <maxnoofCellsinNG-RANnode> | | Complete list of cells served by the ng-eNB. | YES | reject |
| >Served Cell Information E-UTRA | M | | 9.2.2.12 | | — | |
| >Neighbour Information NR | O | | 9.2.2.13 | | — | |
| >Neighbour Information E-UTRA | O | | 9.2.2.14 | | — | |
| List of Satellites | | 0 . . . <maxnoofSatellites> | | Complete list of satellites to which the gNB is connected | YES | ignore |
| >Satellite Information | M | | 9.2.2.x | | — | |
| >List of Served Cells NR | | 1 . . . <maxnoofCellsthroughSatellite> | | Complete list of cells served by the gNB through the satellite | | |
| >> Served Cell Through Satellite Information NR | M | | Served Cell Information NR 9.2.2.11 | | — | |

| Range bound | Explanation |
|---|---|
| maxnoofCellsinNG-RAN node | Maximum no. cells that can be served by a NG-RAN node. Value is 16384. |
| maxnoofSatellites | Maximum no. of satellites. Value is 1024. |
| maxnoofCellsthroughSatellite | Maximum no. of cells that can be served through a satellite. Value is 16384. |

This XN SETUP REQUEST message may be sent by a NG-RAN node, i.e. the first network node 101 and/or second network node 102, to a neighbouring NG-RAN node to transfer application data for an Xn-C interface instance. Direction: NG-RAN node, NG-RAN node$_2$.

One example of a XN SETUP RESPONSE is described below.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| Global NG-RAN Node ID | M | | 9.2.2.3 | | YES | reject |

-continued

| IE/Group Name | Presence | Range | IE type and reference | Semantics description | Criticality | Assigned Criticality |
|---|---|---|---|---|---|---|
| TAI Support List | M | | 9.2.3.20 | List of supported TAs and associated characteristics. | YES | reject |
| List of Served Cells NR | | 0 . . . <maxnoofCellsinNG-RANnode> | | Complete list of cells served by the gNB | YES | reject |
| >Served Cell Information NR | M | | 9.2.2.11 | | — | |
| >Neighbour Information NR | O | | 9.2.2.13 | | — | |
| >Neighbour Information E-UTRA | O | | 9.2.2.14 | | — | |
| List of Served Cells E-UTRA | | 0 . . . <maxnoofCellsinNG-RANnode> | | Complete list of cells served by the ng-eNB | YES | reject |
| >Served Cell Information E-UTRA | M | | 9.2.2.12 | | — | |
| >Neighbour Information NR | O | | 9.2.2.13 | | — | |
| >Neighbour Information E-UTRA | O | | 9.2.2.14 | | — | |
| Criticality Diagnostics | O | | 9.2.3.3 | | YES | ignore |
| List of Satellites | | 0 . . . <maxnoofSatellites> | | Complete list of satellites to which the gNB is connected | YES | ignore |
| >Satellite Information | M | | 9.2.2.x | | — | |
| >List of Served Cells NR | | 1 . . . <maxnoofCellsthroughSatellite> | | Complete list of cells served by the gNB through the satellite | | |
| >> Served Cell Through Satellite Information NR | M | | Served Cell Information NR 9.2.2.11 | | — | |

| Range bound | Explanation |
|---|---|
| maxnoofCellsinNG-RAN node | Maximum no. cells that can be served by a NG-RAN node. Value is 16384. |
| maxnoofSatellites | Maximum no. of satellites. Value is 1024. |
| maxnoofCellsthroughSatellite | Maximum no. of cells that can be served through a satellite. Value is 16384. |

This XN SETUP RESPONSE message may be sent by a NG-RAN node, i.e. the first network node 101 and/or second network node 102, to a neighbouring NG-RAN node to transfer application data for an Xn-C interface instance. Direction: NG-RAN node$_2$ NG-RAN node$_1$.

One example of a NG-RAN CONFIGURATION UPDATE is described below.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| TAI Support List | O | | 9.2.3.20 | List of supported TAs and associated characteristics. | GLOBAL | reject |
| CHOICE Initiating NodeType | M | | | | YES | ignore |
| >gNB | | | | | | |
| >>Served Cells to Update NR | O | | 9.2.2.15 | | YES | ignore |
| >>Cell Assistance Information NR | O | | 9.2.2.17 | | YES | ignore |
| >>List of Satellites | | 0 . . . <maxnoofSatellites> | | Complete list of satellites to which the gNB is connected | YES | ignore |
| >>>Satellite Information | M | | 9.2.2.x | | — | |
| >>>Served Cells Through Satellite to Update NR | M | | Served Cells to Update NR 9.2.2.15 | | — | |
| >ng-eNB | | | | | | |
| >>Served Cells to Update E-UTRA | O | | 9.2.2.16 | | YES | ignore |

| IE/Group Name | Presence | Range | IE type and reference | Semantics description | Criticality | Assigned Criticality |
|---|---|---|---|---|---|---|
| >>Cell Assistance Information NR | O | | 9.2.2.17 | | YES | ignore |
| TNLA To Add List | | 0 . . . 1 | | | YES | ignore |
| >TNLA To Add Item | | 1 . . . <maxnoofTNLAssociations> | | | — | |
| >>TNLA Transport Layer Information | M | | CP Transport Layer Information 9.2.3.31 | CP Transport Layer Information of NG-RAN node₁ | — | |
| >>TNLA Usage | O | | 9.2.3.84 | | — | |
| TNLA To Update List | | 0 . . . 1 | | | YES | ignore |
| >TNLA To Update Item | | 1 . . . <maxnoofTNLAssociations> | | | — | |
| >>TNLA Transport Layer Information | M | | CP Transport Layer Information 9.2.3.31 | CP Transport Layer Information of NG-RAN node₁ | — | |
| >>TNLA Usage | O | | 9.2.3.84 | | — | |
| TNLA To Remove List | | 0 . . . 1 | | | YES | ignore |
| >TNLA To Remove Item | | 1 . . . <maxnoofTNLAssociations> | | | — | |
| >>TNLA Transport Layer Information | M | | CP Transport Layer Information 9.2.3.31 | CP Transport Layer Information of NG-RAN node₁ | — | |
| Global NG-RAN Node ID | O | | 9.2.2.2 | | YES | reject |

| Range bound | Explanation |
|---|---|
| maxnoofTNLAssociations | Maximum numbers of TNL Associations between the NG RAN nodes. Value is 32. |
| maxnoofSatellites | Maximum no. of satellites. Value is 1024. |

This NG-RAN CONFIGURATION UPDATE message may be sent by a NG-RAN node, i.e. the first network node 101 and/or second network node 102, to a neighbouring NG-RAN node to transfer updated information for an Xn-C interface instance. Direction: NG-RAN node₁→NG-RAN node₂.

One example of a NG-RAN CONFIGURATION UPDATE ACKNOWLEDGEMENT is described below.

| IE/Group Name | Presence | Range | IE type and reference | Semantics description | Criticality | Assigned Criticality |
|---|---|---|---|---|---|---|
| Message Type | M | | 9.2.3.1 | | YES | reject |
| CHOICE Responding NodeType | M | | | | YES | ignore |
| >ng-eNB | | | | | | |
| >gNB | | | | | | |
| >>Served NR Cells | | 0 . . . <maxnoofCellsinNG-RANnode> | | Complete or limited list of cells served by a gNB, if requested by an NG-RAN node. | — | |
| >>>Served Cell Information NR | M | | 9.2.2.11 | | — | |
| >>>Neighbour Information NR | O | | 9.2.2.13 | NR neighbours | — | |
| >>>Neighbour Information E-UTRA | O | | 9.2.2.14 | E-UTRA neighbours | — | |
| >>List of Satellites | | 0 . . . <maxnoofSatellites> | | Complete or limited list of satellites to which the gNB is connected | — | |

| IE/Group Name | Presence | Range | IE type and reference | Semantics description | | |
|---|---|---|---|---|---|---|
| >>>Satellite Information | M | | 9.2.2.x | — | | |
| >>> Served NR Cells Through Satellite | | 1 . . . <maxnoofCellthroughSatellite> | | Complete or limited list of cells served by the gNB through the satellite | — | |
| >>>>Served Cell Through Satellite Information NR | M | | Served Cell Information NR 9.2.2.11 | — | | |
| TNLA Setup List | | 0 . . . 1 | | | YES | ignore |
| >TNLA Setup Item | | 1 . . . <maxnoofTNLAssociations> | | — | | |
| >>TNLA Transport Layer Address | M | | CP Transport Layer Information 9.2.3.31 | CP Transport Layer Information as received from NG-RAN node₁ | — | |
| TNLA Failed to Setup Lis | | 0 . . . 1 | | | YES | ignore |
| >TNLA Failed To Setup Item | | 1 . . . <maxnoofTNLAssociations> | | — | | |
| >>TNLA Transport Layer Address | M | | CP Transport Layer Information 9.2.3.31 | CP Transport Layer Information as received from NG-RAN node₁ | — | |
| >>Cause | M | | 9.2.3.2 | — | | |
| Criticality Diagnostics | O | | 9.2.3.3 | | YES | ignore |

| Range bound | Explanation |
|---|---|
| maxnoofCellsinNGRANnode | Maximum no. cells that can be served by an NG-RAN node. Value is 16384. |
| maxnoofTNLAssociations | Maximum numbers of TNL Associations between the eNB and the en-gNB. Value is 32. |
| maxnoofSatellites | Maximum no. of satellites. Value is 1024. |
| maxnoofCellsthroughSatellite | Maximum no. of cells that can be served through a satellite. Value is 16384. |

This NG-RAN CONFIGURATION UPDATE ACKNOWLEDGEMENT message may be sent by a NG-RAN node, i.e. the first network node 101 and/or second network node 102, to neighbouring NG-RAN node to a peer node to acknowledge update of information for a TNL association. Direction: NG-RAN node₂→NG-RAN node₁.

One example of an Information Element, IE, comprising satellite information is according to some embodiments is described below.

| IE/Group Name | Presence | Range | IE type and reference | Semantics description |
|---|---|---|---|---|
| Satellite ID | M | | BIT STRING (SIZE(10)) | |
| Ephemeris Data | O | | OCTET STRING | |

Satellite Context

In some embodiments, related to transfer of satellite information, a satellite context is introduced for individual satellites. This satellite context may contain information about satellite position/trajectory and radio-related information. The position/trajectory information may comprise information, such as, e.g. ephemeris data, satellite trajectory perturbations. The radio-related information may comprise information, such as, e.g. satellite serving cell IDs, satellite power class, bandwidth-capability and/or indications of problems that might be relevant for ground gNBs. This satellite context may be transferred through the Xn interface through a Retrieve Satellite Context function, which may comprise as set of messages, such as, e.g. setup, release and modification-messages.

In some embodiments, the network, the first network node 101, and/or the second network node 102 may comprise a partial or complete list of these contexts and during the Xn SATELLITE CONNECTION REQUEST, the full satellite context or only the ID of the satellite context may be transferred.

In some embodiments, this applies to the regenerative satellite-based NG-RAN architecture where a gNB-DU is hosted on the satellite and the gNB-CU is on the ground, deployed in a centralized/virtualized way, see e.g. FIG. 5. In this case, the gNB-DU is on the moving satellite, the feeder link between the gNB-DU and ground node, i.e. a physical node rather than 3GPP specified logical node, is part of the transport network, TNL, for the F1 interface. The feeder link may be operated with the Stream Control Transmission Protocol, SCTP. Therefore, switching the feeder link is transparent to gNB-CU or gNB-DU, and consists essentially in adding/removing additional SCTP associations between the nodes. According to current F1 specifications, it is the gNB-CU who can add/remove SCTP associations.

Thus, in order for the gNB-CU to know that the gNB-DU is located on a satellite, the first network node 101 and/or second network node 102, i.e. gNB-DUs, may according to some embodiments provide the satellite-related information, such as, e.g. satellite ID, ephemeris data, in the F1 SETUP REQUEST and gNB-DU CONFIGURATION UPDATE messages. Examples of such messages are provided in the tables below. The additions with respect to current specifications are highlighted in bold font. Here, it should also be noted that the gNB-CU may take the received information into account when configuring/reconfiguring the TNL.

One example of a F1 SETUP REQUEST is described below.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| gNB-DU ID | M | | 9.3.1.9 | | YES | reject |
| gNB-DU Name | O | | PrintableString(SIZE (1 . . . 150, . . .)) | | YES | ignore |
| gNB-DU Served Cells List | | 0 . . . 1 | | List of cells configured in the gNB-DU | YES | reject |
| >gNB-DU Served Cells Item | | 1 . . . <maxCellingNBDU> | | | EACH | reject |
| >>Served Cell Information | M | | 9.3.1.10 | Information about the cells configured in the gNB-DU | — | |
| >>gNB-DU System Information | O | | 9.3.1.18 | RRC container with system information owned by gNB-DU | — | |
| gNB-DU RRC version | M | | RRC version 9.3.1.70 | | YES | reject |
| Satellite Information | O | | 9.3.1.x | | YES | reject |

| Range bound | Explanation |
|---|---|
| maxCellingNBDU | Maximum no. cells that can be served by a gNB-DU. Value is 512. |

This F1 SETUP REQUEST message may be sent by a gNB-DU, i.e. the first network node 101 and/or second network node 102, to transfer information for a TNL association. Direction: gNB-DU→gNB-CU.

One example of a gNB-DU CONFIGURATION UPDATE is described below.

| IE/Group Name | Presence | Range | IE type and reference | Semantics description | Criticality | Assigned Criticality |
|---|---|---|---|---|---|---|
| Message Type | M | | 9.3.1.1 | | YES | reject |
| Transaction ID | M | | 9.3.1.23 | | YES | reject |
| Served Cells To Add List | | 0 . . . 1 | | Complete list of added cells served by the gNB-DU | YES | reject |
| >Served Cells To Add Item | | 1 . . . <maxCellingNBDU> | | | EACH | reject |
| >>Served Cell Information | M | | 9.3.1.10 | Information about the cells configured in the gNB-DU | — | |
| >>gNB-DU System Information | O | | 9.3.1.18 | RRC container with system information owned by gNB-DU | — | |
| Served Cells To Modify List | | 0 . . . 1 | | Complete list of modified cells served by the gNB-DU | YES | reject |
| >Served Cells To Modify Item | | 1 . . . <maxCellingNBDU> | | | EACH | reject |
| >>Old NR CGI | M | | NR CGI 9.3.1.12 | | — | |
| >>Served Cell Information | M | | 9.3.1.10 | Information about the cells configured in the gNB-DU | — | |

| | | | | | | |
|---|---|---|---|---|---|---|
| >>gNB-DU System Information | O | | 9.3.1.18 | RRC container with system information owned by gNB-DU | — | |
| Served Cells To Delete List | | 0 . . . 1 | | Complete list of deleted cells served by the gNB-DU | YES | reject |
| >Served Cells To Delete Item | | 1 . . . <maxCellingNBDU> | | | EACH | reject |
| >>Old NR CGI | M | | NR CGI 9.3.1.12 | | — | |
| Cells Status List | | 0 . . . 1 | | Complete list of active cells | YES | reject |
| > Cells Status Item | | 0 . . . <maxCellingNBDU> | | | EACH | reject |
| >> NR CGI | M | | 9.3.1.12 | | — | |
| >>Service Status | M | | 9.3.1.68 | | — | |
| Dedicated SI Delivery Needed UE List | | 0 . . . 1 | | List of UEs unable to receive system information from broadcast | YES | ignore |
| > Dedicated SI Delivery Needed UE Item | | 1 . . . <maxnoofUEIDs> | | | EACH | ignore |
| >>gNB-CU UE F1AP ID | M | | 9.3.1.4 | | — | |
| >>NR CGI | M | | 9.3.1.12 | | — | |
| Satellite Information | O | | 9.3.1.x | | YES | reject |

| Range bound | Explanation |
|---|---|
| maxCellingNBDU | Maximum no. cells that can be served by a gNB-DU. Value is 512. |
| maxnoofUEIDs | Maximum no. of UEs that can be served by a gNB-DU. Value is 65536. |

This gNB-DU CONFIGURATION UPDATE message may be sent by a gNB-DU, i.e. the first network node 101 and/or second network node 102, to transfer updated information for a TNL association. Direction: gNB-DU→gNB-CU.

Figure 12:
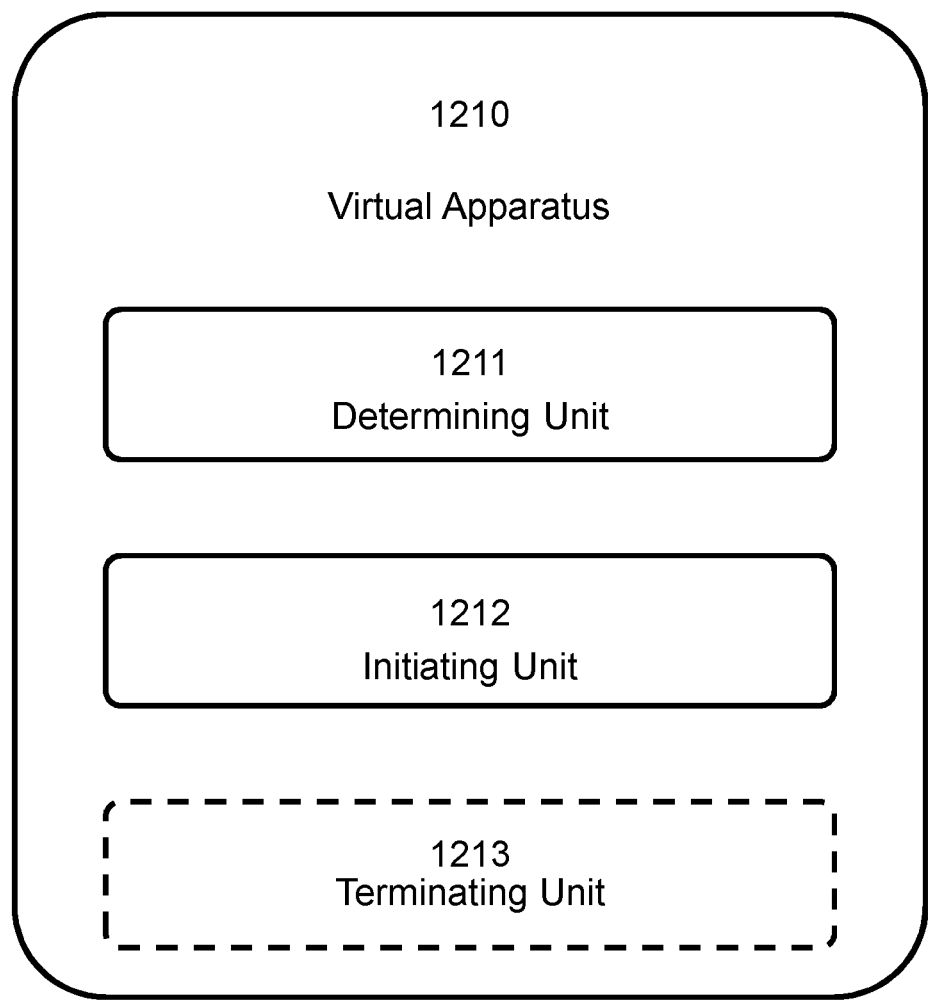
FIG. 12 is a block diagram depicting embodiments of a first network node.

To perform the method actions in a first network node 101 for enabling a second feeder link 132 to be established between a second network node 102 and an airborne or orbital communication node 110 in non-terrestrial communications network 100 to handle wireless devices 121 being served by the airborne or orbital communication node 110, wherein the first network node 101 is handling the wireless devices 121 served by the airborne or orbital communication node 110 over a first feeder link 131 between the first network node 101 and the airborne or orbital communication node 110, the first network node 101 may comprise the following arrangement depicted in FIG. 12. FIG. 12 shows a schematic block diagram of embodiments of a virtual apparatus 1210 that may be implemented in the first network node 101.

FIG. 12 illustrates a schematic block diagram of embodiments of an apparatus 1210 in a non-terrestrial communications network 100 (for example, the NTNs shown in FIG. 1-5 or 23-26). Apparatus 1210 is operable to carry out the example method described with reference to FIGS. 7-11, and possibly any other processes or methods disclosed herein. It is also to be understood that the method of FIGS. 7-11 is not necessarily carried out solely by apparatus 1210. At least some operations of the method can be performed by one or more other entities.

Apparatus 1210 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a determining unit 1211, a initiating unit 1212 and a terminating unit 1213, and any other suitable units of apparatus 1210 to perform corresponding functions according one or more embodiments of the present disclosure.

The first network node 101, apparatus 1210 and/or processing circuitry therein is configured to, or may comprise the determining unit 1211 configured to, determine that the wireless devices served by the airborne or orbital communication node 110 are to be handled by the second network node 102 over the second feeder link 132. Also, the first network node 101, apparatus 1210 and/or processing circuitry therein is configured to, or may comprise the initiating unit 1212 configured to, initiate the second feeder link 132 to be established between the second network node 102 and the airborne or orbital communication node 110.

In some embodiments, the first network node 101, apparatus 1210 and/or processing circuitry therein may be configured to, or may comprise the initiating unit 1212 configured to, transmit, to the second network node 102, information indicating that the second network node 102 is to establish the second feeder link 132 towards the airborne or orbital communication node 110 in order to handle wireless devices 121 being served by the airborne or orbital communication node 110. In some embodiments, the first network node 101, apparatus 1210 and/or processing circuitry therein may be configured to, or may comprise the initiating unit 1212 configured to transmit the information in a SATELLITE CONNECTION REQUEST message over an Xn interface. According to some embodiments, the information may comprise one or more of: an identifier of the airborne or orbital communication node 110, a position of the airborne or orbital communication node 110, information indicating the served cell(s) that the first network node 101 is providing through the airborne or orbital communication node 110, CD-SSB frequency locations, context information relating to the airborne or orbital communication node 110, and a handover, HO, message for each wireless device 121 served by the first network node 101. In this case, according to some embodiments, the served cell(s) that the first network node 101 is providing through the airborne or orbital communication node 110 is indicated via their cell IDs/PCIs.

Optionally, according to some embodiments, the first network node 101, apparatus 1210 and/or processing circuitry therein may be configured to, or may comprise the initiating unit 1212 configured to, establish the second feeder link 132 towards the airborne or orbital communication node 110. This may, for example, be performed in a regenerative architecture, wherein the switch from the first feeder link to the second feeder link may comprise the addition/removal of an SCTP association between the logical node on the ground, e.g. CU-gNB, and the one on the satellite, e.g. DU-gNB, aided by additional information exchanged therein between over the RNL layer.

In some embodiments, the first network node 101, apparatus 1210 and/or processing circuitry therein may be configured to, or may comprise the initiating unit 1212 configured to, receive, from the second network node 102, information indicating that the second network node 102 has established the second feeder link 132 towards the airborne or orbital communication node 110 in order to handle wireless devices 121 being served by the airborne or orbital communication node 110. After receiving the information from the second network node 102, the first network node 101, apparatus 1210 and/or processing circuitry therein may be configured to, or may comprise the initiating unit 1212 configured to, initiate a handover procedure of the wireless devices 121 served by the airborne or orbital communication node 110 from the first network node 101 to the second network node 102. For example, after having completed the handover procedure, the first network node 101, apparatus 1210 and/or processing circuitry therein may be configured to, or may comprise the initiating unit 1212 configured to, terminate the first feeder link 131 between the first network node 101 and the airborne or orbital communication node 110.

Figure 13:
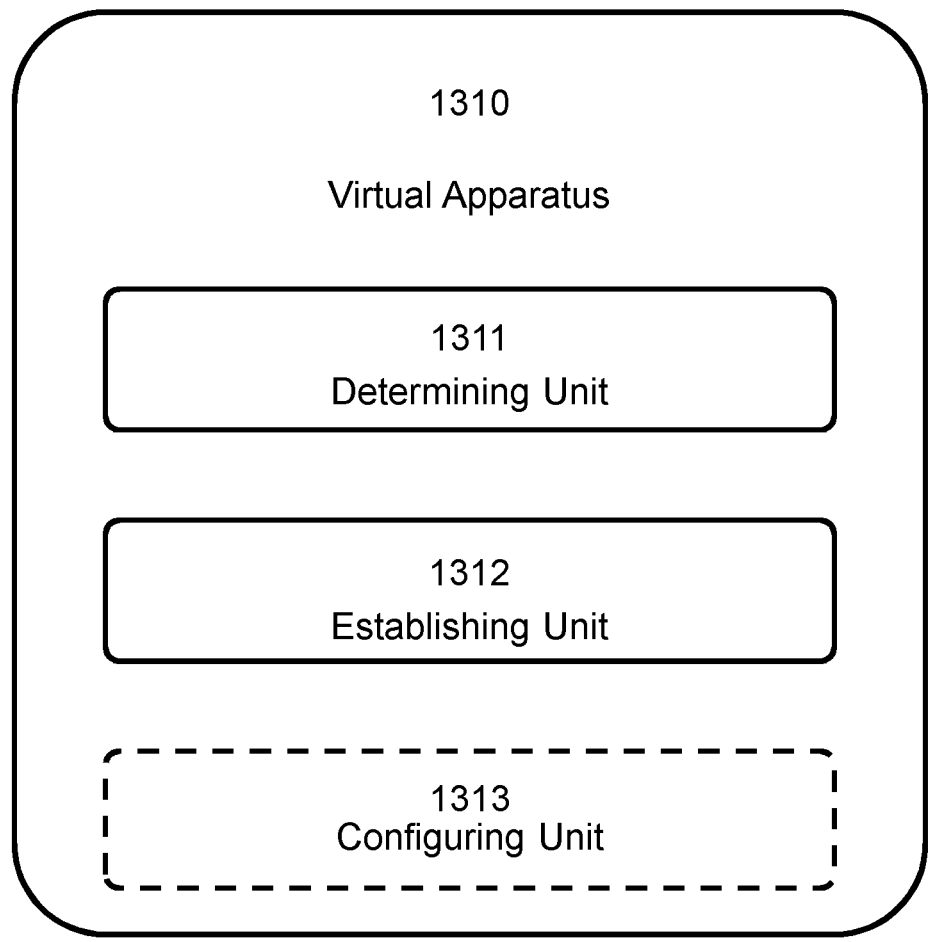
FIG. 13 is a block diagram depicting embodiments of a second network node.
Figure 14:
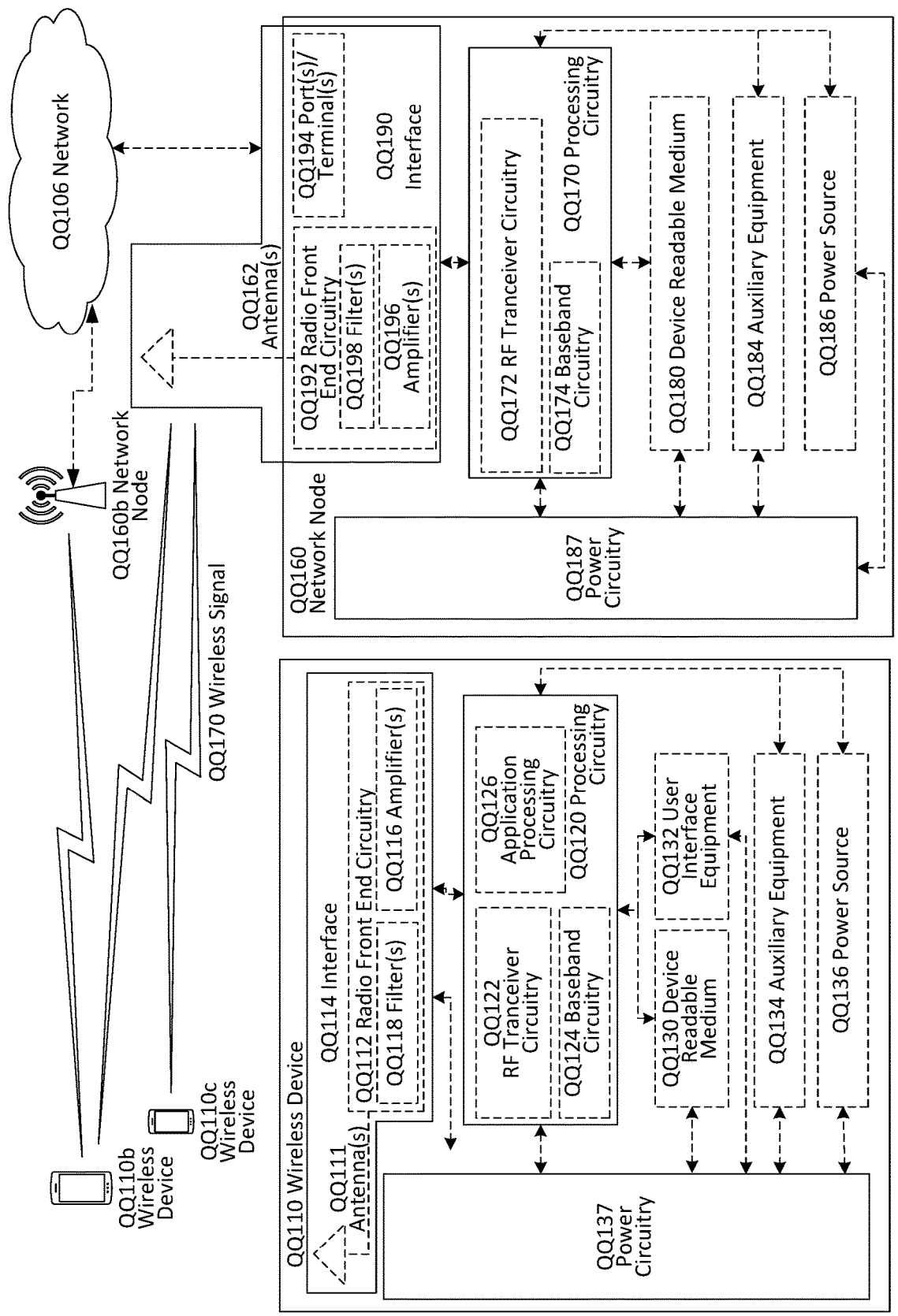
FIG. 14 is a schematic illustration of a wireless network in accordance with some embodiments.

To perform the method actions in a second network node 102 for establishing a second feeder link 132 towards an airborne or orbital communication node 110 in non-terrestrial communications network 100 to handle wireless devices 121 being served by the airborne or orbital communication node 110, wherein a first network node 101 is handling the wireless devices served by the airborne or orbital communication node over a first feeder link 131 between the first network node 101 and the airborne or orbital communication node 110, the second network node 102 may comprise the following arrangement depicted in FIG. 13. FIG. 13 shows a schematic block diagram of embodiments of a virtual apparatus 1310 that may be implemented in the second network node 102.

FIG. 13 illustrates a schematic block diagram of embodiments of an apparatus 1310 in a non-terrestrial communications network 100 (for example, the NTNs shown in FIG. 1-5 or 23-26). Apparatus 1310 is operable to carry out the example method described with reference to FIGS. 7-11, and possibly any other processes or methods disclosed herein. It is also to be understood that the method of FIGS. 7-11 is not necessarily carried out solely by apparatus 1310. At least some operations of the method can be performed by one or more other entities.

Apparatus 1310 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a determining unit 1311, a establishing unit 1312 and a configuring unit 1313, and any other suitable units of apparatus 1310 to perform corresponding functions according one or more embodiments of the present disclosure.

The second network node 102, apparatus 1310 and/or processing circuitry therein is configured to, or may comprise the determining unit 1311 configured to, determine that the wireless devices 121 served by the airborne or orbital communication node 110 are to be handled by the second network node 102 over the second feeder link 132. Also, the second network node 102, apparatus 1310 and/or processing circuitry therein is configured to, or may comprise the establishing unit 1312 configured to, establish the second feeder link 132 towards the airborne or orbital communication node 110. In some embodiments, the second network node 102, apparatus 1310 and/or processing circuitry therein may be configured to, or may comprise the determining unit 1311 configured to, receive from the first network node 101, information indicating that the second network node 102 is to establish the second feeder link 132 towards the airborne or orbital communication node 110 in order to handle wireless devices 121 being served by the airborne or orbital communication node 110.

In some embodiments, the second network node 102, apparatus 1310 and/or processing circuitry therein may be configured to, or may comprise the configuring unit 1313 configured to, configure the second network node 102 for handling wireless devices 121 being served by the airborne or orbital communication node 110. In this case, according to some embodiments, the second network node 102, apparatus 1310 and/or processing circuitry therein may be configured to, or may comprise the configuring unit 1313 configured to, transmit, to the first network node 101, information indicating that the second network node 102 has established the second feeder link 132 towards the airborne or orbital communication node 132 in order to handle wireless devices 121 being served by the airborne or orbital communication node 110. Here, according to some embodiments, the second network node 102, apparatus 1310 and/or processing circuitry therein may be configured to, or may comprise the configuring unit 1313 configured to, transmit the information in a SATELLITE CONNECTION REQUEST ACKNOWLEDGMENT message over an Xn interface. According to some embodiments, the served cell(s) that the second network node 102 is providing through the airborne or orbital communication node 110. In this case, according to some embodiments, the served cell(s) that the second network node 101 is providing through the airborne or orbital communication node 110 is indicated via their cell IDs/PCIs.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

It should also be noted that the various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although the subject matter described herein may be implemented in any appropriate type of system using any suitable components, the embodiments disclosed herein are described in relation to a wireless network, such as the example wireless network illustrated in FIG. 22. For simplicity, the wireless network of FIG. 22 only depicts network QQ106, network nodes QQ160 and QQ160*b*, and WDs QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 22, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 22 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 22 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 15:
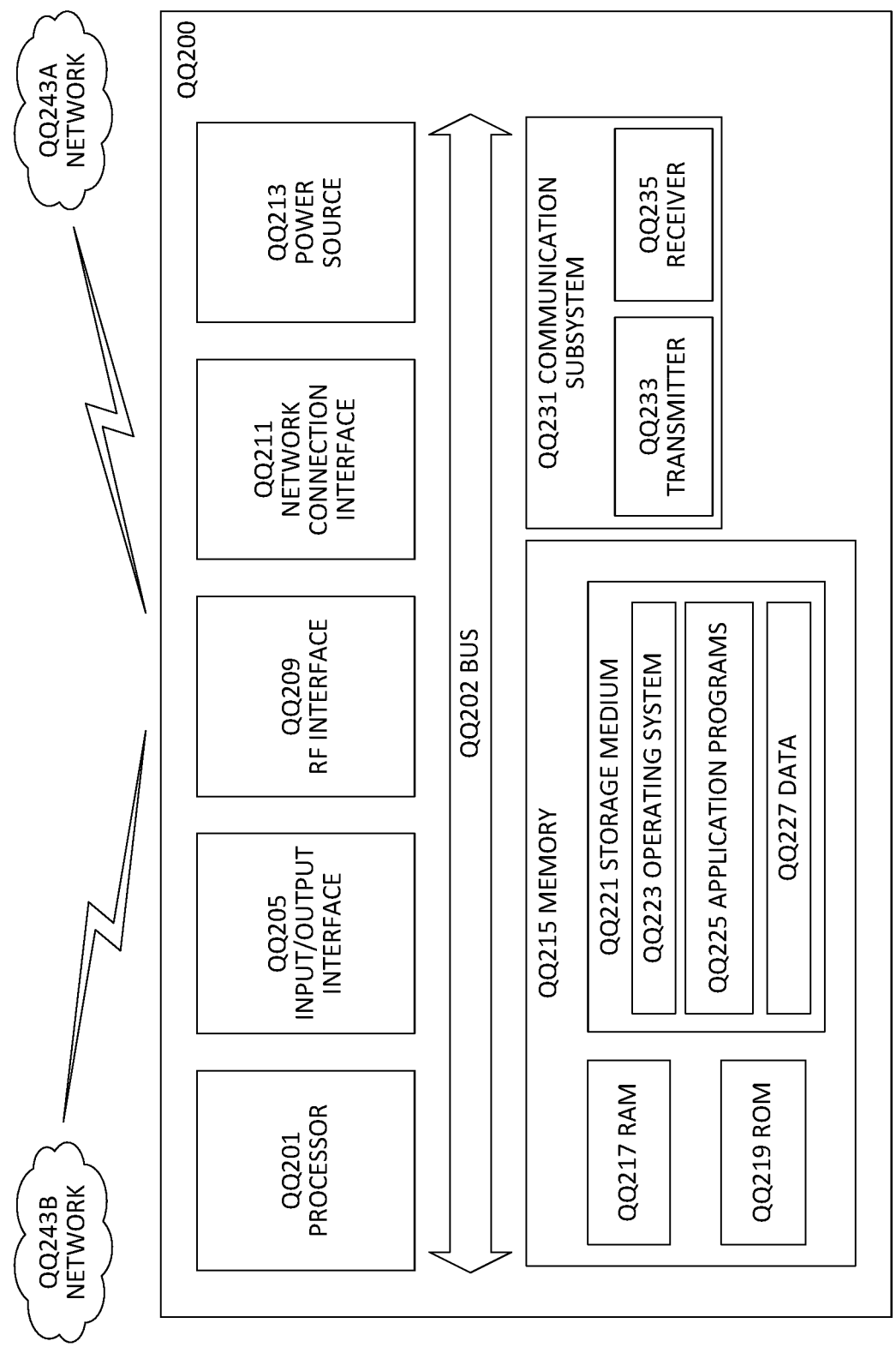
FIG. 15 is a schematic illustration of a user equipment.

FIG. 15 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 15, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately. RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 15, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200. The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein.

Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 16:
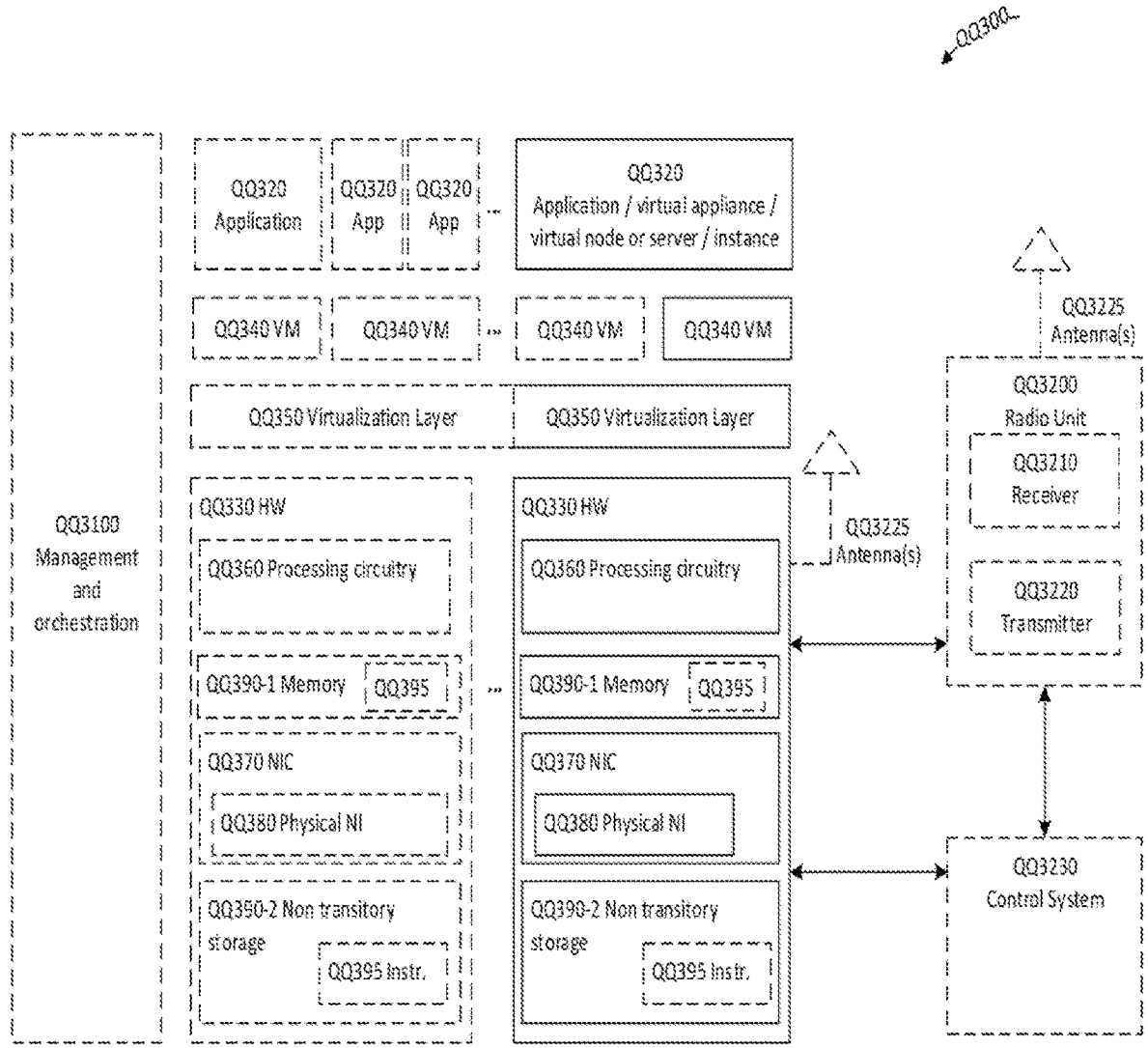
FIG. 16 is a schematic illustration of a virtualization environment in accordance with some embodiments, FIG. 17 schematically illustrates a telecommunication network connected via an intermediate network to a host computer.

FIG. 16 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 16, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. QQ3. In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station. In some embodiments, some signalling can be effected with the use of control system QQ3230 which may alternatively be used for communication between the hardware nodes QQ330 and radio units QQ3200.

Figure 17:
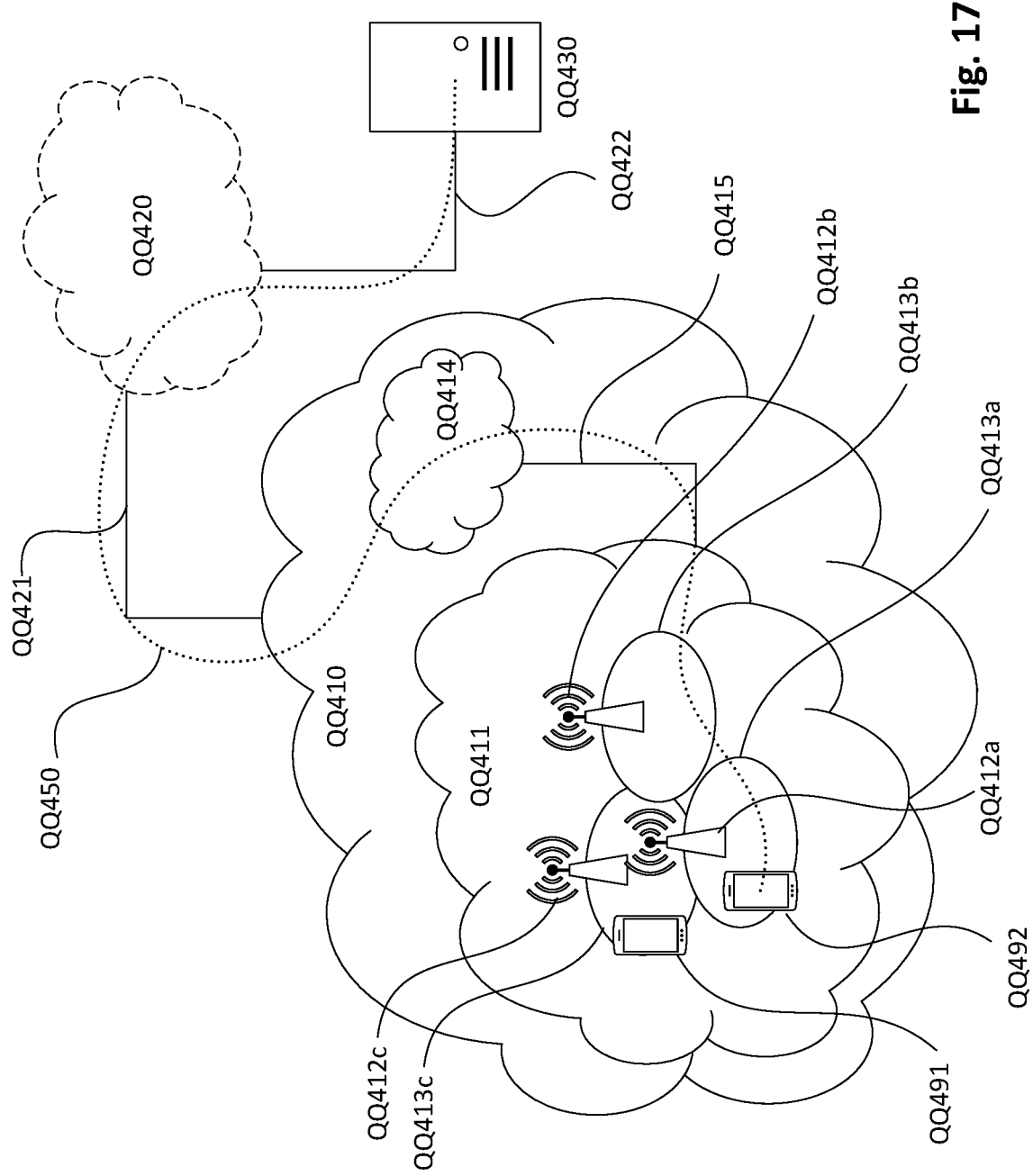

With reference to FIG. 17, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 17 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 18. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 18) served by base station QQ520. Communication interface QQ526 may be configured to facilitate connection QQ560 to host computer QQ510. Connection QQ560 may be direct or it may pass through a core network (not shown in FIG. 18) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides. It is noted that host computer QQ510, base station QQ520 and UE QQ530 illustrated in FIG. 18 may be similar or identical to host computer QQ430, one of base stations QQ412a, QQ412b, QQ412c and one of UEs QQ491, QQ492 of FIG. 17, respectively. This is to say, the inner workings of these entities may be as shown in FIG. 18 and independently, the surrounding network topology may be that of FIG. 17.

Figure 18:
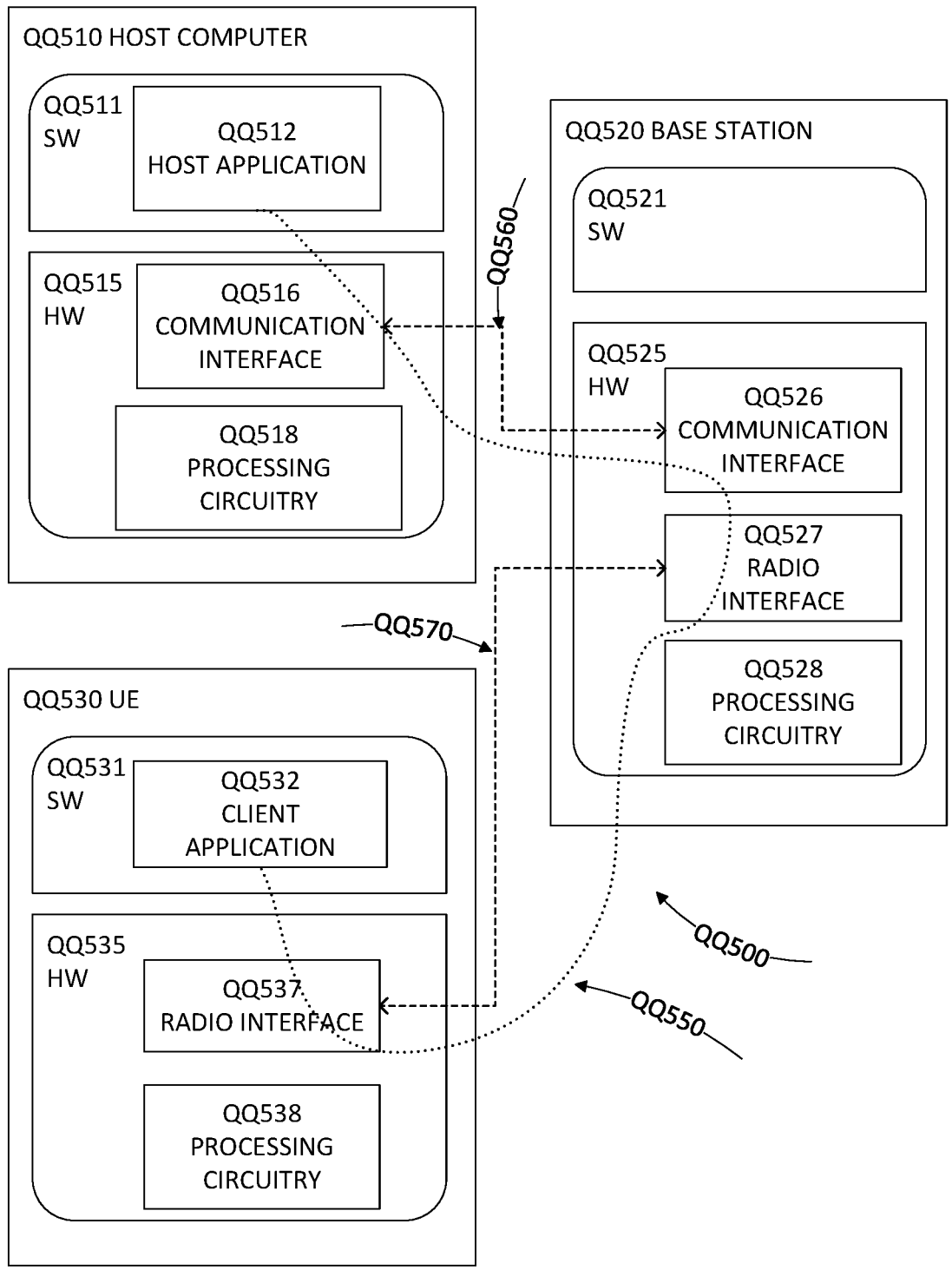
FIG. 18 is a generalized block diagram of a host computer communicating via a base station with a user equipment over a partially wireless connection.

In FIG. 18, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may avoid service interruptions due to e.g. maintenance, traffic offloading and that (e.g. for LEO) the satellite moving out of visibility with respect to the current Earth station, thereby provide benefits, such as, reduced user waiting time and/or reduces user service interruptions.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities.

The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figures 19, 20:
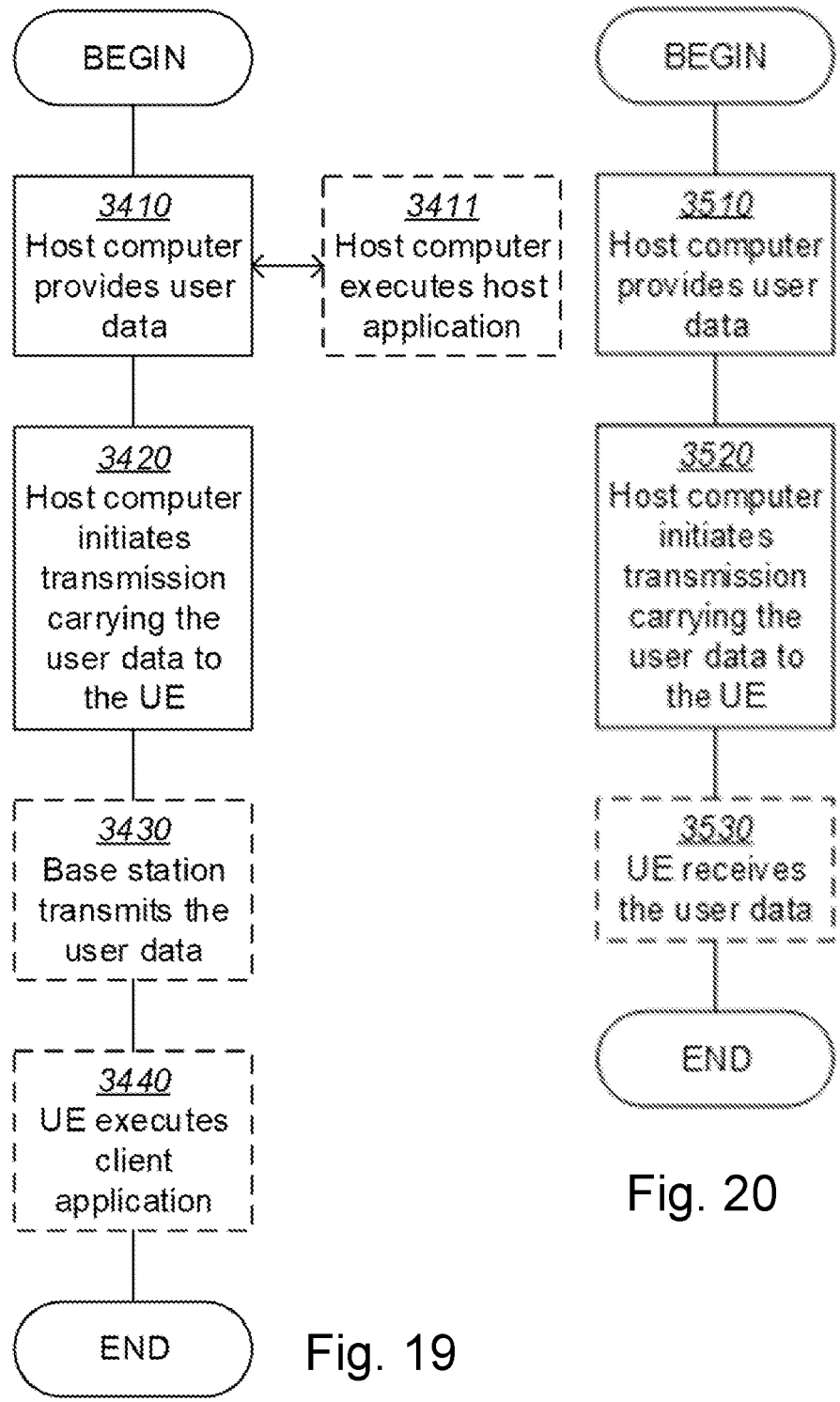

FIG. 19 is a flowchart illustrating a method implemented in a communication system, in accordance with one embodiment. The communication system includes a host computer, a base station and a UE which may be those described with reference to FIGS. 17 and 10. For simplicity of the present disclosure, only drawing references to FIG. 19 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 20 is a flowchart illustrating a method implemented in a communication system, in accordance with one embodiment. The communication system includes a host computer, a base station and a UE which may be those described with reference to FIGS. 17 and 10. For simplicity of the present disclosure, only drawing references to FIG. 20 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIG. 21 is a flowchart illustrating a method implemented in a communication system, in accordance with one embodiment. The communication system includes a host computer, a base station and a UE which may be those described with reference to FIGS. 17 and 10. For simplicity of the present disclosure, only drawing references to FIG. 21 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station and a UE which may be those described with reference to FIGS. 17 and 10. For simplicity of the present disclosure, only drawing references to FIG. 22 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Additional Aspects of Some Embodiments

According to one embodiment, a communication system including a host computer is provided. The communication system comprises: processing circuitry configured to provide user data; and a communication interface configured to forward the user data to a cellular network for transmission to at least one user equipment (UE), wherein the cellular network comprises a base station having a radio interface and processing circuitry, the base station's processing circuitry configured to perform any of the steps of the methods described with reference to FIGS. 7-11 above.

This communication system may further include the base station. Also, the communication system may further including at least one UE, wherein the at least one UE is configured to communicate with the base station. Further, in the communication system, the processing circuitry of the host computer may be configured to execute a host application, thereby providing the user data; and the at least one UE may comprise processing circuitry configured to execute a client application associated with the host application.

According to another embodiment, a method implemented in a communication system including a host computer, a base station and a user equipment (UE) is provided. The method may comprise: at the host computer, providing user data; and at the host computer, initiating a transmission carrying the user data to the UE via a cellular network comprising the base station, wherein the base station performs any of the steps of the methods described with reference to FIGS. 7-11 above. The method may comprise, at the base station, transmitting the user data. Further, in the method, the user data may be provided at the host computer by executing a host application. Additionally, the method may further comprise, at the UE, executing a client application associated with the host application.

According to a further embodiment, a user equipment (UE) configured to communicate with a base station is provided. The UE may comprise a radio interface and processing circuitry configured to perform the method as described above.

According to yet a further embodiment, a communication system including a host computer comprising a communication interface configured to receive user data originating from a transmission from a user equipment (UE) to a base station is provided. The base station comprises a radio interface and processing circuitry, the base station's processing circuitry configured to perform any of the steps of the methods described with reference to FIGS. 7-11 above. The communication system may further including the base station. Also, the communication system may further including the UE, wherein the UE is configured to communicate with the base station. Further, in the communication system, the processing circuitry of the host computer may be configured to execute a host application; and the UE may be configured to execute a client application associated with the host application, thereby providing the user data to be received by the host computer.

Yet Additional Aspects of Some Embodiments

During NTN operation, it may become necessary to switch the feeder link (SRI) between different Earth stations toward the same satellite. This may be due to e.g. maintenance, traffic offloading, or (for LEO) due to the satellite moving out of visibility with respect to the current Earth station. The switch may potentially cause a major service disruption over any network interfaces transported over the SRI (Uu, F1, NG, and/or Xn, depending on the NTN architecture option) toward the UEs served by the satellite switching feeder link. This scenario may occur for different NTN architecture options. At least in some cases, it may be beneficial to provide some information in the RNL to ensure the switch is performed without affecting services.

A first scenario is shown in FIG. 23. Due to e.g. maintenance, traffic offloading, or if (for LEO) the satellite moves out of visibility with respect to the old Earth station, it may become necessary to switch the feeder link to a new Earth station. The implications for this scenario may be different depending on different NTN architectures. The different NTN architectures considered herein are:

1. Transparent satellite based non-terrestrial access network (Section 5.1 of TR 38.821 v. 0.3.0;
2. Regenerative satellite and split gNB (Section 5.3.2 of TR 38.821 v. 0.3.0);
3. Regenerative satellite and on-board gNB(s) (Sec. 5.2.1 of TR 38.821 v. 0.3.0);
4. Regenerative satellite with Inter-Satellite Links (ISLs), gNB processed payload (Section 5.2.1 of TR 38.821 v. 0.3.0);
5. gNB processed payload, Relay-like architecture (Sec. 5.3.3 of TR 38.821 v. 0.3.0).

1. Transparent Satellite

In this case, the SRI transports the Uu interface as well as all the information to be broadcasted into the served cells; in this case the satellite is essentially a "bent pipe", and the gNBs are located at the ground stations. The switchover will have to consist in the new gateway connecting to the satellite before the old one loses visibility and activating a set of cells so that the satellite may "overlay" them on the existing coverage area, on top of those provided by the old gateway. The served UEs will then measure the new cells, and the old gNB will trigger mobility to the new cells. A prerequisite for this solution is that the cells from the new gNB are seen as neighbors by the old gNB, hence Xn needs to be up and running between the two gNBs. In addition, the whole process from cell reporting to handover completion needs to take place before the satellite is disconnected from the old Earth station (this may be critical for the LEO case).

Observation 1: In case of transparent satellite, switching the satellite link from the old to the new Earth station requires Xn to be up and running between the two gNBs on the ground, involves the new gNB overlaying a new set of "neighbor" cells over those provided by the old gNB, and offloading UEs from the old to the new gNB; the whole process must be completed before the satellite is disconnected from the old Earth station.

In this case it may be beneficial for the two gNBs to exchange information over Xn, about the satellite(s) potentially involved. This can be done by signaling over the Xn Setup and/or Configuration Update procedures the following information:

A list of satellites to which the gNB connects;

For each satellite in the list, an ID, a list of cell(s) from the gNB which is served through the satellite, and the ephemeris data for the satellite.

With the above information, the receiving gNB can locate the satellite at the appropriate moment and start serving its own cells through it so that the served UEs can be offloaded to the new cells. This can address the case of switchovers due to the LEO satellite movement.

According to some embodiments, it is proposed to cover the case of satellite switchovers due to e.g. LEO satellite movement, the gNBs on the ground should exchange over Xn Setup and/or NG-RAN Node Configuration Update procedures, a list of satellites to which they connect, including a satellite ID, a list of cell(s) served through the satellite, and the ephemeris data for the satellite.

For "planned" switchovers, we might envisage a dedicated, non-UE-associated Xn procedure (e.g. SATELLITE CONNECTION REQUEST/REPLY/FAILURE messages) to signal to the new gNB that it should start connecting to the specified satellite. The old gNB would indicate a list of served cells through the satellite, and the new gNB would respond with a list of served cells through that satellite.

According to some embodiments, it is proposed to, for planned satellite link switchovers (e.g. triggered by OAM), a dedicated, non-UE-associated Xn procedure (e.g. Satellite Connection Request, Class 1) should be introduced to signal from the old to the new gNB that it should connect to the specified satellite. The signalling flow is shown in FIGS. 7-9.

2. Regenerative Satellite, Split gNB

In this case, the satellite hosts the DU, and the CU(s) are on the ground. Notice that due to NG-RAN architecture as described in TS 38.401 v. 15.4.0, it is not possible to connect a DU to more than one CU, nor to have a "seamless" switch of a DU between CUs; that is, F1 must be torn down and set up again. Observation 2: For the "regenerative satellite, split gNB" option, it is not possible to have a seamless switch of the F1 interface toward the DU on the satellite between an "old" and a "new" CU on the ground. However, the satellite link switchover scenario might be supported for this architecture option is if the CU is centralized.

Figure 2:
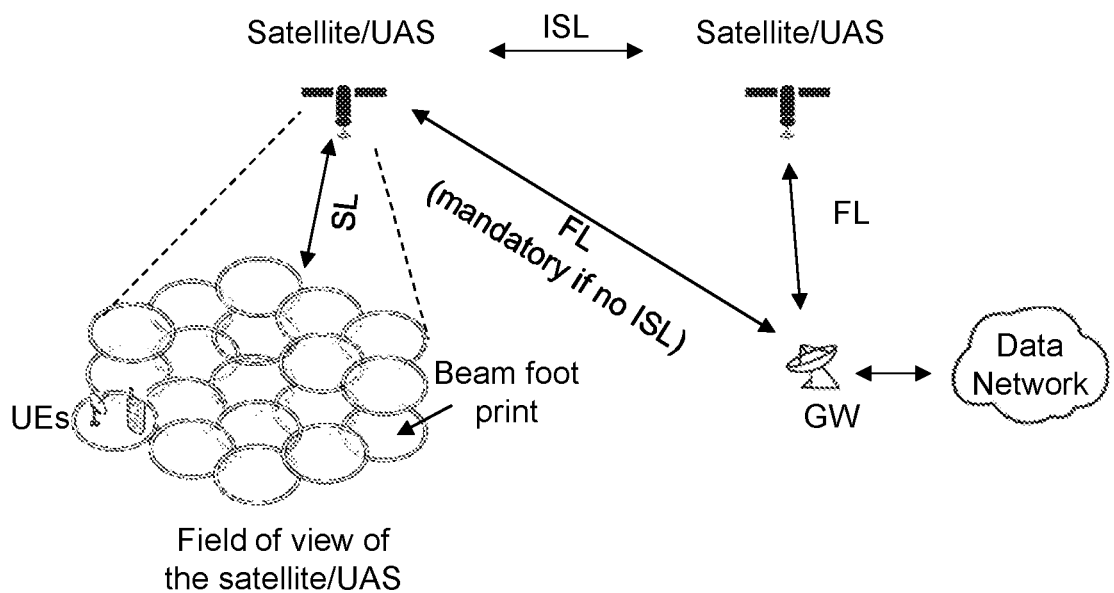
FIG. 2 is a schematic block diagrams illustrating a non-terrestrial communications network providing access to user equipments using a regenerative satellite payload.

FIG. 24 shows a centralized CU scenario for the NTN shown in FIG. 2 wherein the feeder links are part of the transport network for F1. In this case, the Earth stations are part of the transport network between the DU on the satellite and the centralized CU. Both the old and the new feeder link are part of the TNL which transports the F1 interface between the CU and the DU. With this scenario, switching the feeder link is equivalent to adding/removing an SCTP association between the CU and the DU. According to current specifications, this can be triggered from the gNB-CU.

According to some embodiments, it is proposed to, for the "regenerative satellite, split gNB" architecture option, satellite link switchovers can be supported as SCTP association addition/removals by deploying a centralized CU; this is supported by current specifications. It seems beneficial for the DU to signal, at F1 Setup and/or DU Configuration Update, the relevant satellite information (e.g. satellite ID, ephemeris data); the CU may take it into consideration when configuring the TNL.

According to some embodiments, it is proposed that the DU should signal, at F1 Setup and/or DU Configuration Update, the relevant satellite information (e.g. satellite ID, ephemeris data); the CU may take it into consideration when configuring the TNL.

3. Regenerative Satellite, On-Board gNB

In this case (with or without ISLs), the gNB is on the satellite. Also, in this case, the switchover can be supported by considering the Earth stations as part of the transport network between the gNB and the AMF.

FIG. 25 shows another scenario for the NTN shown in FIG. 2 wherein the feeder links are part of the transport network for NG. With this scenario, switching the feeder link is equivalent to adding/removing an SCTP association between the gNB and the AMF. According to current specifications, this can be triggered from the AMF.

According to some embodiments, it is proposed to, for the "regenerative satellite, on-board gNB" architecture option, satellite link switchovers can be supported as SCTP association addition/removals between the gNB and the AMF; this is supported by current specifications. It seems beneficial for the gNB to signal, at NG Setup and/or RAN Configuration Update, the relevant satellite information (e.g. satellite ID, ephemeris data); the AMF may take it into consideration when configuring the TNL.

According to some embodiments, it is proposed that the gNB should signal, at NG Setup and/or RAN Configuration Update, the relevant satellite information (e.g. satellite ID, ephemeris data); the AMF may take it into consideration when configuring the TNL.

In other words, the switching of the feeder link toward a satellite may also be described as in the following. During NTN operation, it may become necessary to switch the feeder link (SRI) between different NTN GWs toward the same satellite. This may be due to e.g. maintenance, traffic offloading, or (for LEO) due to the satellite moving out of visibility with respect to the current NTN GW. The switchover should be performed without causing service disruption to the served UEs. This can be done in different ways according to the NTN architecture option deployed.

For the transparent satellite case, the switchover relies on the temporary overlap of cells from the gNBs located at the old and the new NTN GWs. The UEs are then handed over from the old to the new gNB, before the old gNB detaches from the satellite. It is a prerequisite that the cells from the new gNB are seen as neighbors by the old gNB, hence Xn needs to be up and running between the two gNBs. Furthermore, the whole process (from UEs measuring the new cells to handover completion) needs to take place before the old gNB detaches from the satellite (potentially critical for the LEO case). It may be beneficial for the two gNBs to exchange information at Xn Setup and/or NG-RAN Node Configuration Update about the satellite(s) potentially involved, for example, a list of satellites to which the gNB connects; and, for each satellite in the list, an ID, a list of cell(s) from the gNB which is served through the satellite, and the ephemeris data for the satellite. The switchover may be time-based (e.g. at regular intervals for LEO constellations, based on the ephemeris information) or event-triggered (e.g. for maintenance). In this case, it could be beneficial to introduce a dedicated, non-UE-associated Xn procedure (Satellite Connection Request) to signal from the old to the new gNB that it should connect to the specified satellite, optionally including the list of cells served through the satellite. The signalling details of the signalling for this "planned" satellite link switchover when using a transparent satellite are shown in FIGS. 7-9 above.

For the regenerative satellite case and when having a split gNB, the switchover may be supported for this architecture option only if the gNB-CU on the ground is centralized. In this case, both NTN GWs are part of the TNL transporting the F1 interface between the gNB-DU on the satellite and the centralized gNB-CU. The switchover is then equivalent to adding/removing an SCTP association between the CU and the DU. According to current specifications, this is triggered from the gNB-CU. It seems beneficial for the DU to signal, at F1 Setup and/or DU Configuration Update, the relevant satellite information (e.g. satellite ID, ephemeris data); the CU may take it into consideration when configuring the TNL.

For the regenerative satellite case and when having a gNB on-board, both NTN GWs are part of the TNL transporting the F1 interface between the gNB on the satellite and the AMF. The switchover is then equivalent to adding/removing an SCTP association between the gNB and the AMF. According to current specifications, this is triggered from the AMF. It seems beneficial for the gNB to signal, at NG Setup and/or RAN Configuration Update, the relevant satellite information (e.g. satellite ID, ephemeris data); the AMF may take it into consideration when configuring the TNL.

Yet Further Additional Aspects of Some Embodiments

Figure 26:
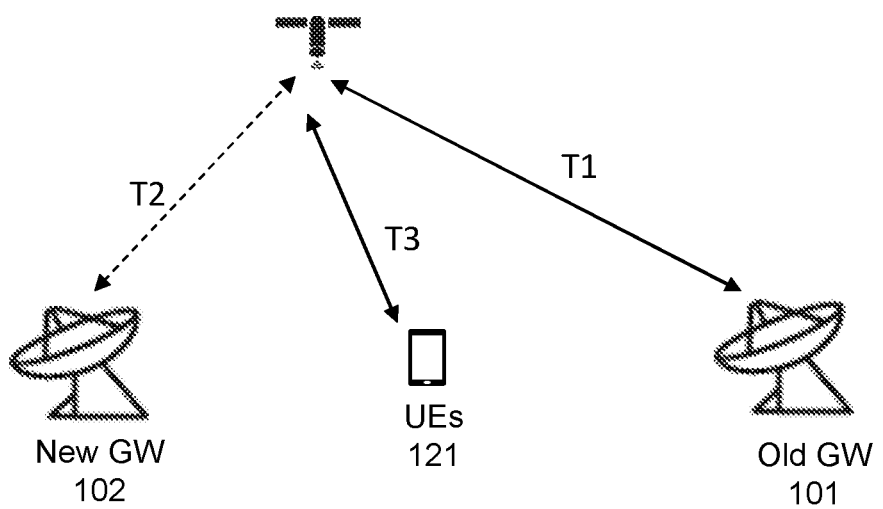
FIG. 26 is a further schematic block diagram illustrating a non-terrestrial communications network providing access to user equipments while switching feeder link of an airborne or orbital communications node according to some embodiments.

FIG. 26 shows a simplified schematic block diagram illustrating a non-terrestrial communications network providing access, i.e. service link T3, to user equipments while switching feeder link of an airborne or orbital communications node, i.e. from feeder link T1 to feeder link T2, according to some embodiments. Here, the satellite gateway changes such that the first sat-gateway moves out of coverage from the satellite and therefore the second sat-gateway should handle the communication (dashed line) with the satellite.

The standard 3GPP TR 38.821 describes that a Non-GEO satellite served successively by one sat-gateway at a time. Here, it also mentions that the system ensures service and feeder link continuity between the successive serving sat-gateways with sufficient time duration to proceed with mobility anchoring and hand-over. However, it should be clarified what does it exactly mean from a RAN2 perspective when it is stated that "the system ensures service and feeder link continuity" in view of the issues described in herein. Further, the term mobility anchoring would be good to be clarified so as to be understood more clearly.

Figure 27:
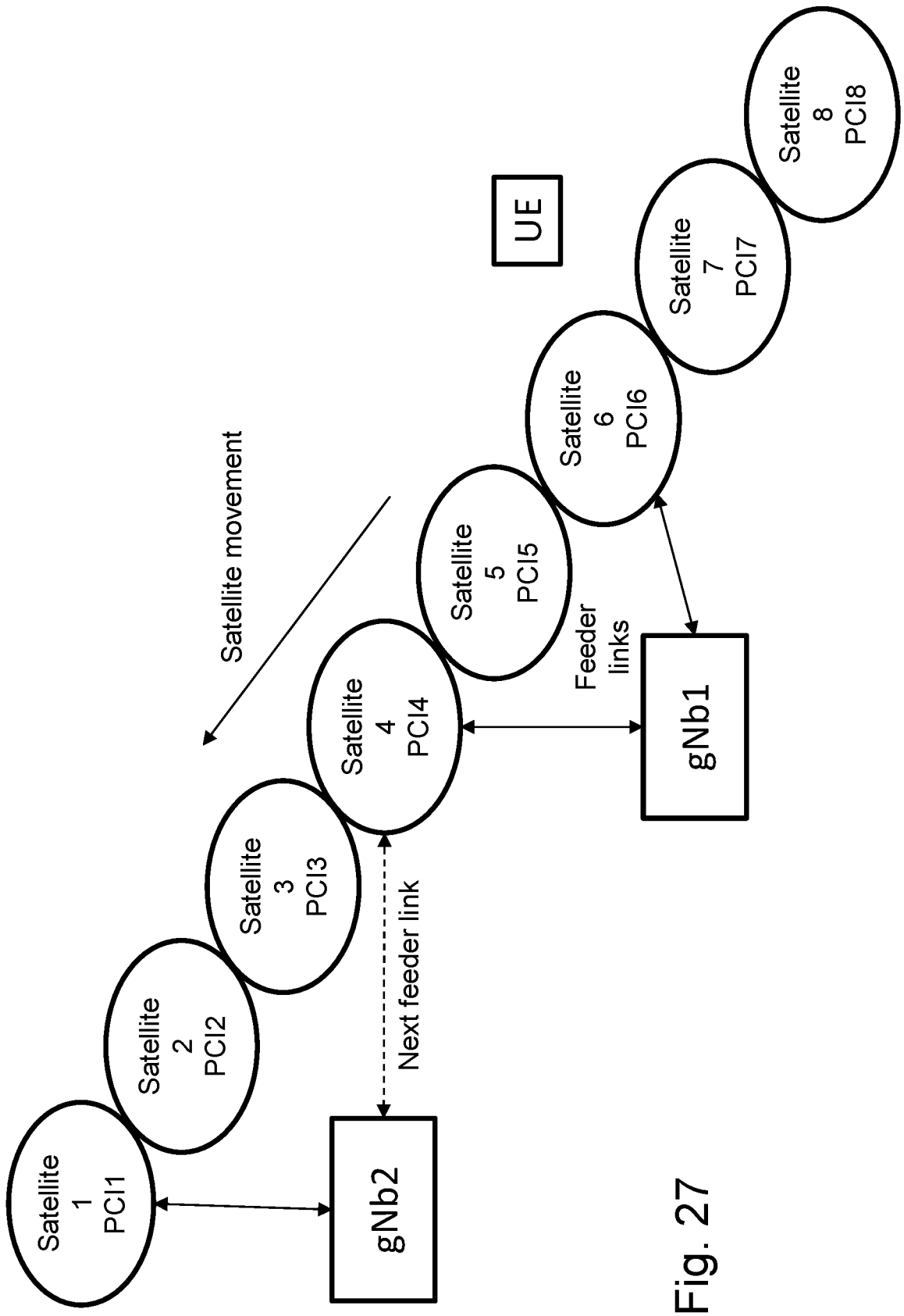
FIG. 27 is a schematic block diagram illustrating a feeder link switch for a transparent non-terrestrial communications network according to some embodiments.

FIG. 27 shows a schematic block diagram illustrating a feeder link switch for a transparent non-terrestrial communications network, e.g. LEO NTN, according to some embodiments. In other words, a feeder link switch case is depicted in FIG. 27 for Satellite 4 that is broadcasting PCI4. One cell per satellite is assumed here for simplicity but it could be a set of cells from one satellite as well. Assume further that there are UEs served by the cell with PCI 4 while the feeder link switches.

As seen in FIG. 27, in the transparent case, the gNB is on located on earth. Thus, there will be a switch from gNB1 to gNB2. If the satellite may be served by one feeder link at a time it means that, with Rel-15 NR assumptions, the RRC connection for all UEs served by the gNB1 needs to be dropped. After gNB2 takes over, the UEs may find the reference signals corresponding to gNB2 and request an RRC connection to be set up to gNB2.

In theory, it could be possible for gNB2 to keep PCI4. Then, if it could be assumed that from UE perspective it is ok to keep sending SSB corresponding to PCI4 but switch "behind the curtains" from gNB1 to gNB2 including the corresponding SI, the transition could be smoother than drop off and reconnect. However, this is not seen as a very straightforward option. At least it would be something very different than what has so far been considered for LTE/NR networks. If it is possible to assume two feeder link connections serving via the same satellite during the transition, there exists a HO based solution that should be feasible with Rel-15 or close to Rel-15 assumptions.

Figure 28:
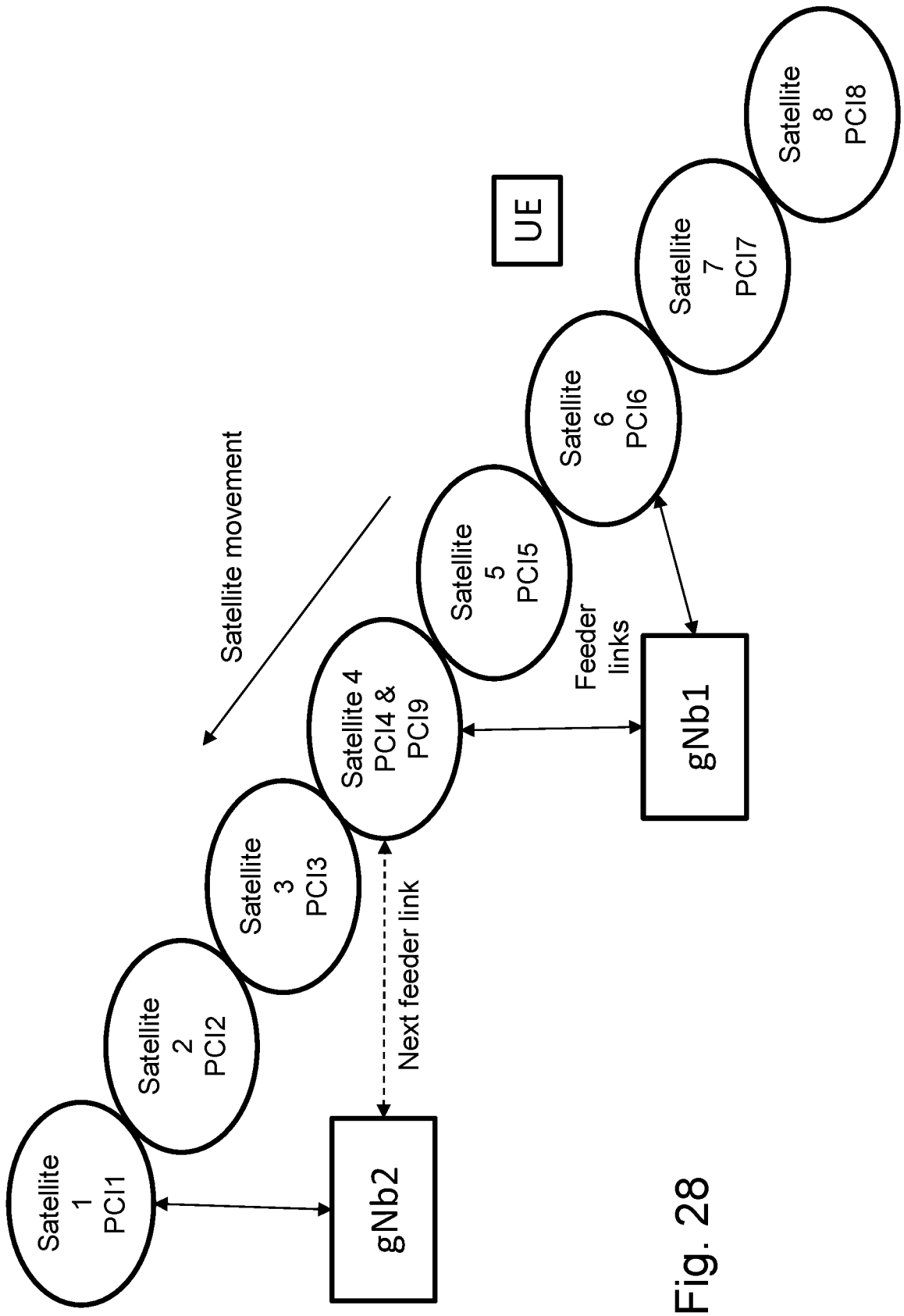
FIG. 28 is another schematic block diagram illustrating a feeder link switch for a transparent non-terrestrial communications network according to some embodiments.

FIG. 28 depicts this case wherein the feeder link switch for a LEO satellite is performed with two feeder links serving the satellite during the switch. Here, it is assumed that two SSBs (PCIs) are sent within the DL "carrier" or bandwidth of a cell as depicted in the standard 3GPP TS 38.300 Appendix B.2. During the switch, the gNB2 may start transmitting the CD-SSBs of its cells on synchronization raster points that are different from those of the gNB1. UEs could be have a HO from PCI9 belonging to gNB1 to PCI4 belonging to gNB2. This could be blind HO or assisted with measurements. For idle mode UEs, the SIB1 of PCI9 could broadcast a flag to tell camping UEs to find another cell to camp. This information could include PCI4 and the raster point. It could utilize the method of MIB to indicate to UEs whether SIB1 is broadcasted and if not broadcasted it tells where to find the next CD-SSB.

Figure 29:
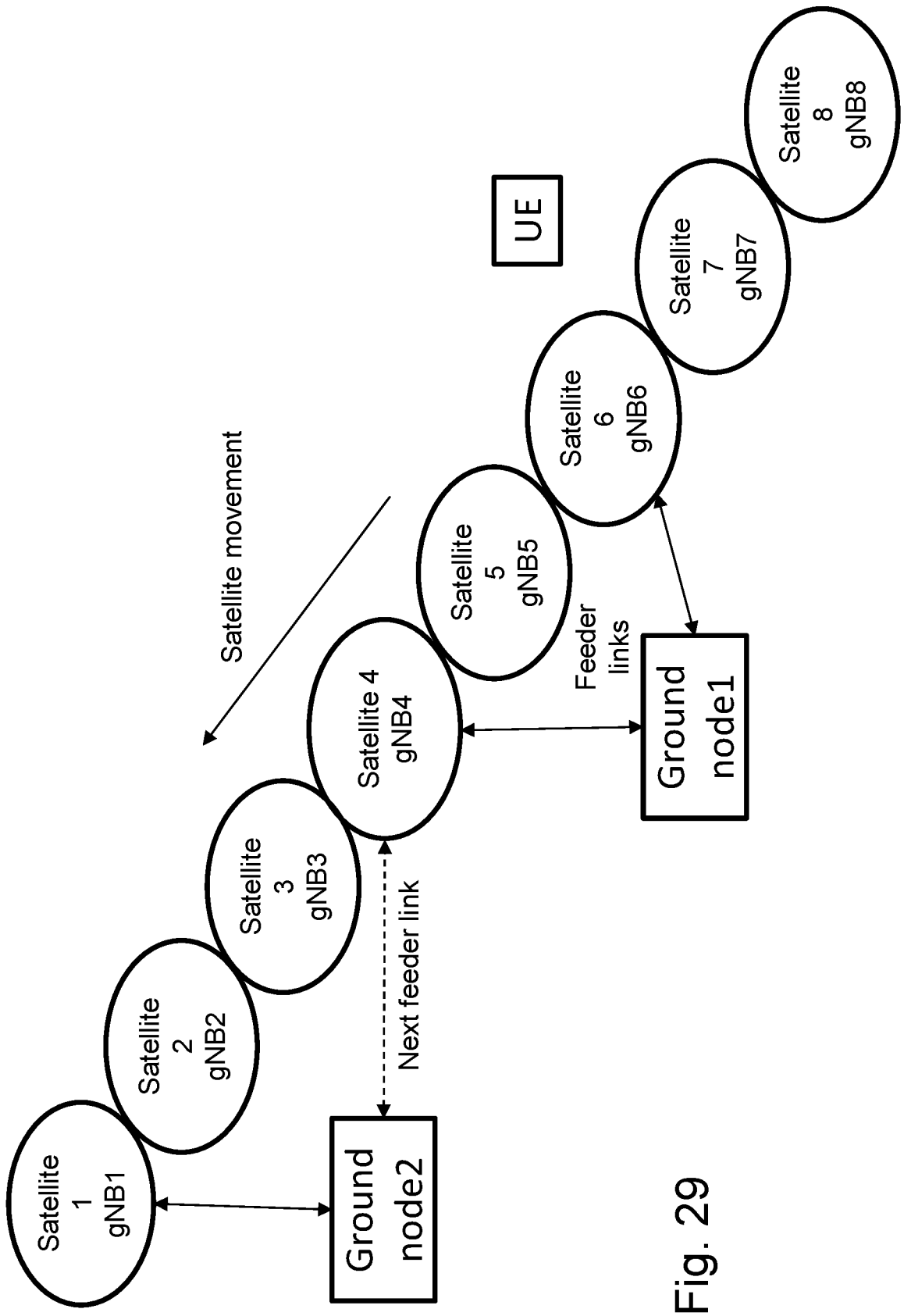
FIG. 29 is another schematic block diagram illustrating a feeder link switch for a regenerative non-terrestrial communications network according to some embodiments.

FIG. 29 shows a schematic block diagram illustrating a feeder link switch for a regenerative non-terrestrial communications network, e.g. LEO NTN, according to some embodiments. In one of the architecture options of the regenerative LEO, the gNB is on-board of the satellite as payload. From RAN2 perspective, this case is considerably simpler. From connected mode mobility perspective this case does not seem to bring standard changes from RAN2 perspective.

The embodiments herein are not limited to the above described preferred embodiments. Various alternatives, modifications and equivalents may be used. Therefore, the above embodiments should not be construed as limiting.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

5GC 5G Core Network
AMF Access and Mobility Management Function
CN Core Network
CU Centralized Unit
DU Distributed Unit
ISL Inter-Satellite Link
GEO Geostationary Earth Orbit
GPS Global Positioning System
LEO Low Earth Orbit
NG-RAN 5G NG Radio Access Network
NR New Radio
NTN Non-Terrestrial Networks
NTN GW NTN GateWay
RF Radio Frequency
SCTP Stream Control Transfer Protocol
SRI Satellite Radio Interface
UAS Unmanned Aircraft System
DL Downlink
eNB E-UTRAN NodeB
gNB Base station in NR
HO Handover
HSPA High Speed Packet Access
HRPD High Rate Packet Data
LOS Line of Sight LPP LTE Positioning Protocol
LTE Long-Term Evolution
NR New Radio
PGW Packet Gateway
PLMN Public Land Mobile Network
RAN Radio Access Network
RAT Radio Access Technology
RRC Radio Resource Control
SGW Serving Gateway
SI System Information
SIB System Information Block
SS Synchronization Signal
SSS Secondary Synchronization Signal
UE User Equipment
UL Uplink

The invention claimed is:

1. A method performed by a first network node for enabling a second feeder link to be established between a second network node and an airborne or orbital communication node in non-terrestrial communications network to handle wireless devices being served by the airborne or orbital communication node, wherein the first network node is handling the wireless devices served by the airborne or orbital communication node over a first feeder link between the first network node and the airborne or orbital communication node, the method comprising:
determining that the wireless devices served by the airborne or orbital communication node are to be handled by the second network node over the second feeder link; and
initiating the second feeder link to be established between the second network node and the airborne or orbital communication node,
transmitting, to the second network node, information indicating that the second network node is to establish the second feeder link towards the airborne or orbital communication node in order to handle the wireless devices being served by the airborne or orbital communication node,
wherein the information comprises one or more of:
an identifier of the airborne or orbital communication node,
a position of the airborne or orbital communication node,
information indicating a served cell(s) that the first network node is providing through the airborne or orbital communication node,
CD-SSB frequency locations,
context information relating to the airborne or orbital communication node; and
a handover message for each wireless device served by the first network node.

2. The method of claim 1, wherein the information is transmitted in a SATELLITE CONNECTION REQUEST message over an Xn interface.

3. The method of claim 1, wherein the served cell(s) that the first network node is providing through the airborne or orbital communication node is indicated via cell IDs/PCIs of the served cell(s).

4. The method of claim 1, further comprising:
receiving, from the second network node, information indicating that the second network node has established the second feeder link towards the airborne or orbital communication node in order to handle the wireless devices being served by the airborne or orbital communication node;
initiating a handover procedure of the wireless devices served by the airborne or orbital communication node from the first network node to the second network node; and
terminating the first feeder link between the first network node and the airborne or orbital communication node.

5. The method of claim 1, further comprising:
obtaining user data; and
forwarding the user data to a host computer or a wireless device.

6. A first network node for enabling a second feeder link to be established between a second network node and an airborne or orbital communication node in non-terrestrial communications network to handle wireless devices being served by the airborne or orbital communication node, wherein the first network node is handling the wireless devices served by the airborne or orbital communication node over a first feeder link between the first network node and the airborne or orbital communication node, the first network node comprising:
interface circuitry configured to communicate with at least the second network node; and
processing circuitry operatively coupled to the interface circuitry, the processing circuitry being configured to:
determine that the wireless devices served by the airborne or orbital communication node are to be handled by the second network node over the second feeder link,
initiate the second feeder link to be established between the second network node and the airborne or orbital communication node, and
transmit to the second network node, via the interface circuitry, information indicating that the second network node is to establish the second feeder link towards the airborne or orbital communication node in order to handle the wireless devices being served by the airborne or orbital communication node,
wherein the information comprises one or more of:
an identifier of the airborne or orbital communication node,
a position of the airborne or orbital communication node,
information indicating a served cell(s) that the first network node is providing through the airborne or orbital communication node,
CD-SSB frequency locations,
context information relating to the airborne or orbital communication node; and
a handover message for each wireless device served by the first network node.

7. A method performed by a second network node for establishing a second feeder link towards an airborne or orbital communication node in non-terrestrial communications network to handle wireless devices being served by the airborne or orbital communication node, wherein a first network node is handling the wireless devices served by the airborne or orbital communication node over a first feeder link between the first network node and the airborne or orbital communication node, the method comprising:
determining that the wireless devices served by the airborne or orbital communication node are to be handled by the second network node over the second feeder link;
establishing the second feeder link towards the airborne or orbital communication node; and
transmitting, to the first network node, information indicating that the second network node has established the second feeder link towards the airborne or orbital communication node in order to handle the wireless devices being served by the airborne or orbital communication node, wherein the information indicates a served cell(s) that the second network node is providing through the airborne or orbital communication node.

8. The method of claim 7, further comprising:
receiving, from the first network node, information indicating that the second network node is to establish the second feeder link towards the airborne or orbital communication node in order to handle the wireless devices being served by the airborne or orbital communication node.

9. The method of claim 7, further comprising:
configuring the second network node for handling the wireless devices being served by the airborne or orbital communication node.

10. The method of claim 7, wherein the information is transmitted in a SATELLITE CONNECTION REQUEST ACKNOWLEDGMENT message over an Xn interface.

11. The method of claim 7, wherein the served cell(s) that the first network node is providing through the airborne or orbital communication node is indicated via cell IDs/PCIs of the served cell(s).

12. The method of claim 7, further comprising:
obtaining user data; and
forwarding the user data to a host computer or a wireless device.

13. A second network node for establishing a second feeder link towards an airborne or orbital communication node in non-terrestrial communications network to handle wireless devices being served by the airborne or orbital communication node, wherein a first network node is handling the wireless devices served by the airborne or orbital communication node over a first feeder link between the first network node and the airborne or orbital communication node, the second network node comprising:

interface circuitry configured to communicate with at least the first network node; and processing circuitry operatively coupled to the interface circuitry, the processing circuitry being configured to:
determine that the wireless devices served by the airborne or orbital communication node are to be handled by the second network node over the second feeder link,
establish the second feeder link towards the airborne or orbital communication node, and
transmit, to the first network node, information indicating that the second network node has established the second feeder link towards the airborne or orbital communication node in order to handle the wireless devices being served by the airborne or orbital communication node, wherein the information indicates a served cell(s) that the second network node is providing through the airborne or orbital communication node.

* * * * *